US012280706B2

(12) United States Patent
Clapson

(10) Patent No.: US 12,280,706 B2
(45) Date of Patent: Apr. 22, 2025

(54) CARGO STACKING DEVICES AND SYSTEMS

(71) Applicant: Maxiloda Limited, Hamilton (NZ)

(72) Inventor: David Edward Clapson, Hamilton (NZ)

(73) Assignee: MAXILODA LIMITED, Hamilton (NZ)

( * ) Notice: Subject to any disclaimer, the term of this patent is extended or adjusted under 35 U.S.C. 154(b) by 843 days.

(21) Appl. No.: 17/607,582

(22) PCT Filed: Apr. 30, 2020

(86) PCT No.: PCT/NZ2020/050040
§ 371 (c)(1),
(2) Date: Oct. 29, 2021

(87) PCT Pub. No.: WO2020/222658
PCT Pub. Date: Nov. 5, 2020

(65) Prior Publication Data
US 2022/0219590 A1    Jul. 14, 2022

(30) Foreign Application Priority Data
Apr. 30, 2019 (NZ) ........................ 752996

(51) Int. Cl.
*B60P 1/00* (2006.01)
*B60P 1/52* (2006.01)
(Continued)

(52) U.S. Cl.
CPC ............... *B60P 1/649* (2013.01); *B60P 1/003* (2013.01); *B60P 1/52* (2013.01); *B60P 1/6409* (2013.01);
(Continued)

(58) Field of Classification Search
CPC .. B60P 7/00; B60P 1/649; B60P 1/003; B60P 1/52; B60P 1/6409; B60P 7/15; B60R 11/00; B60R 2011/0084
See application file for complete search history.

(56) References Cited

U.S. PATENT DOCUMENTS 4,094,546 A    6/1978  Glassmeyer et al.
7,028,872 B2*  4/2006  Lobanoff ............... B60R 5/047
                                                    211/85.15
(Continued)

FOREIGN PATENT DOCUMENTS

DE    202017100112 U1    3/2017
FR       2977854 A1      1/2013

OTHER PUBLICATIONS

"Maxiloda—Innovative Transportation Solutions!," accessed on the internet at https://www.youtube.com/watch?v=sdsmvHilQNY>, Published on Oct. 26, 2015/, retrieved Aug. 3, 2020 (Whole Video).
(Continued)

*Primary Examiner* — Steven O Douglas
(74) *Attorney, Agent, or Firm* — Haukaas Fortius PLLC; Michael Haukaas; Paul K. Judd

(57) ABSTRACT

A cargo storage system has at least one pair of rails configured to extend along a length of the cargo storage area in a horizontal direction, the pair of rails comprising a first rail configured to extend along a first side of the cargo storage area, and a second rail configured to extend along a second side of the cargo storage area opposing the first rail. The cargo system further has a plurality of support beams extending between, and supported by, the first rail and the second rail. Different configurations of the rails, profiles for the rails, and platform members to be secured between the support beams are also described.

20 Claims, 17 Drawing Sheets

(51) Int. Cl.
    *B60P 1/64*          (2006.01)
    *B60P 7/15*          (2006.01)
    *B60R 11/00*        (2006.01)

(52) U.S. Cl.
    CPC ............... *B60P 7/15* (2013.01); *B60R 11/00* (2013.01); *B60R 2011/0084* (2013.01)

(56) References Cited

U.S. PATENT DOCUMENTS

| | | |
|---|---|---|
| 8,950,988 B2 | 2/2015 | Rabarts et al. |
| 10,112,464 B2* | 10/2018 | Koengeter ................ B60P 7/02 |
| 2006/0192402 A1 | 8/2006 | Mirabella et al. |
| 2010/0034629 A1* | 2/2010 | Hamann ................. B60P 1/003 |
| | | 414/462 |
| 2016/0121780 A1 | 5/2016 | Lee et al. |

OTHER PUBLICATIONS

International Search Report and Written Opinion of the ISA/AU in PCT/US2019/041840, dated Aug. 10, 2020, 13pgs.

* cited by examiner

CARGO STACKING DEVICES AND SYSTEMS

STATEMENT OF CORRESPONDING APPLICATIONS

This application is a National Stage filing under 35 U.S.C. § 371 of International Application No. PCT/NZ2020/050040, filed Apr. 30, 2020, which claims the benefit of New Zealand Patent Application Number 752996, filed Apr. 30, 2019, the entire contents of which are incorporated herein by reference.

TECHNICAL FIELD

The present invention relates to systems and devices for use in load stacking, more particular storage systems for use in the transportation of cargo in a vehicle.

BACKGROUND

Cargo vehicles, such as semi-trailers, box trucks, vans, train cars, etc. are often used to transport or temporarily store cargo. Depending on the shape, size, quantity, orientation or other characteristics of the cargo, it may be difficult to maximize efficient use of the cargo space of those vehicles. For example, certain cargo units, such as individual items or pallets of items, may be relatively short compared to the height of the semi-trailer, but the nature of the items may prevent them from being stacked on top of one another. As a result, there may be significant amounts of wasted space in the upper portions of the semi-trailer.

The present application is directed to overcoming one or more of the problems discussed above.

It is an object of the present invention to address one or more of the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present technology there is provided a cargo storage system comprising:
at least one pair of rails configured to extend along a length of the cargo storage area in a horizontal direction, the pair of rails comprising a first rail configured to extend along a first side of the cargo storage area, and a second rail configured to extend along a second side of the cargo storage area opposing the first rail; and
a plurality of support beams, each support beam configured to extend between, and be supported by, the first rail and the second rail.

In exemplary embodiments, each rail comprises a track, and each support beam comprises a first track guide at a first end and a second track guide at a second end, each track guide configured to be received by a respective track. In exemplary embodiments each track guide may comprise at least one load roller configured to bear against the associated track. For completeness it should be appreciated that alternative track guide movement mechanisms are contemplated, for example glides made of a plastics material such as nylon. In exemplary embodiments the support beam may be configured to receive a portion of the respective track guides at opposing ends of the support beam. In exemplary embodiments the tracks may be configured as enclosed tracks, retaining at least a portion of the track guides.

In exemplary embodiments the system comprises a braking or locking mechanism for selectively restricting movement of a support beam along the rails. In an exemplary embodiment each support beam comprises a locking pin configured to engage a select one of a plurality of locking pin locating features provided on at least one of the rails.

In exemplary embodiments neighboring support beams may be releasably secured relative to each other using one or more spacer beams. In exemplary embodiments each support beam may comprise at least one spacer beam pivotally attached thereto, configured to pivot from a stored position against the support beam and an in-use position extending from the support beam. In exemplary embodiments each support beam comprises a bracket to which a spacer beam extending from a neighboring support beam may be releasably secured. In an exemplary embodiment an upper surface of each spacer bar may be substantially level with the support surface.

In exemplary embodiments, a spacer beam bracket may be provided for use in securing spacer beams to support. The bracket may provide multiple functions: providing a pivotal connection to one end of the spacer beam, releasably connecting to the free end of the spacer beam while it is folded against the support beam in a stored position, and releasably connecting to a spacer beam of a neighboring support beam. In examples, the bracket may include a base. In examples the base may comprise two recessed fastener apertures. In examples a first wall and a second wall may extend from the base, having a space therebetween. Each wall may have an associated fastener aperture. Each wall may comprise a chamfered inner edge extending around a corner of the wall. The bracket may further comprise a first stop and a second stop extending towards each other along one side edge of the base from the first wall and the second wall respectively. In an exemplary embodiment the bracket may be manufactured as a monolithic structure, for example a one-piece casting. In an exemplary embodiment the cargo storage system comprises a first pair of rails and a second pair of rails, wherein the first pair of rails is provided above the second pair of rails within the cargo storage area.

In an exemplary embodiment the cargo storage system comprises a pair of transition rails between the first pair of rails and the second pair of rails. In an exemplary embodiment the transition rails follow a nonvertical path between the first pair of rails and the second pair of rails. In an exemplary embodiment each transition rail forms a junction with an associated horizontal rail of the second pair of rails, wherein the horizontal rail extends in both directions from the junction.

In an exemplary embodiment each transition rail comprises a safety station configured to present a tortuous section to a support beam passing along the transition rails, particularly to interrupt or at least slow unrestrained descent of the support beam from the first pair of rails to the second pair of rails. For example, the safety station may comprise a portion of the transition rail having a reverse curvature. Reference to a reverse curvature should be understood to mean a shape in which a curve transitions to another curve in the opposite direction—occasionally referred to as an "S" curve.

In exemplary embodiments in which each rail comprises an enclosed track, each rail may comprise a drop in beam opening on an upper side of the rail leading into the enclosed track. The drop in beam openings allow support beams to be introduced to, and retrieved from, the rails. The drop in beam openings may be provided on one or both of the first pair of rails and/or the second pair of rails. In exemplary embodiments the drop in beam openings may be provided between the junctions and the ends of the second pair of rails proximate a loading end of the cargo storage area. In exemplary embodiments each rail may include a horizontal lead-in section connecting to the drop in beam opening.

Each rail has a rail profile comprising a side section, an upper section extending from the side section, and a lower section extending from the side section and opposing the upper section. Surfaces of the side section, upper section, and lower section define an enclosed track cavity in which the track guide is received, and will herein be referred to as internal surfaces. In exemplary embodiments the side section extends below the lower section. In exemplary embodiments the lower section includes a recess configured to receive a roller of the track guide, wherein the recess faces the upper section. In exemplary embodiments the internal surface of the side section may comprise at least one recess extending along the length of the rail. In exemplary embodiments fastener apertures may be provided through the side section in the recess. In an exemplary embodiment, locking pin locating features may be provided in the internal surface of the side section. In exemplary embodiments the locking pin locating features may be provided at a location where the thickness of the side wall is greater than at the recess. In exemplary embodiments spacer features may be provided on a surface of the side wall facing away from the enclosed track cavity.

In an exemplary embodiment, one of the first pair of rails or the second pair of rails may comprise a first rail profile, and the other pair of rails may comprise a second rail profile. The first and second rail profiles may be configured to account for different use cases in order to reduce the overall weight of the system, and therefore tare weight of the cargo vehicle. More particularly, where a pair of rails are configured to support the support beams in an unloaded condition, the first rail profile may be lighter than the second rail profile. In an example the side section of the second rail profile may extend further below the lower section than in the first rail profile.

In an exemplary embodiment the support beam has a support surface, configured to face upwardly in use to support a load placed on the support beam. In an exemplary embodiment the support surface comprises a plurality of ridges. In exemplary embodiments the ridges may extend along the length of the support surface. In exemplary embodiments the ridges may be provided as castellations across the width of the support surface. In exemplary embodiments the ridges may be provided on the tops of base castellations. In exemplary embodiments the height of each ridge may be between about 1 mm to about 6 mm, for example about 1.5 mm. In exemplary embodiments the width of each ridge may be between about 1 mm to about 6 mm, for example about 2.5 mm. In exemplary embodiments the width of each ridge may be greater than the height of the ridge. In exemplary embodiments a grip pattern may be provided on the support surface. In examples, the grip pattern may be provided by knurling.

In an exemplary embodiment, the support beam has a hollow structural section. In an exemplary embodiment the hollow structural section has an upper wall, a lower wall, a first side wall, and a second side wall defining an internal cavity. In an exemplary embodiment each side wall may comprise one or more internal recesses extending along the length of the cavity. In exemplary embodiments the internal recesses may be provided proximate the vertical centre of each side wall. In exemplary embodiments two internal recesses may be provided in each side wall, spaced apart to retain a thicker section between them.

In an exemplary embodiment the system comprises at least one platform member configured to extend between neighbouring support beams. In exemplary embodiments each platform member may be selectively secured to one or both of the beams.

In an exemplary embodiment the at least one platform member comprises a rigid sheet material. In an exemplary embodiment the platform member may comprise a sandwich panel (i.e. a core layer sandwiched between two skins). In an exemplary embodiment the sandwich panel may be a polycarbonate sandwich panel such as a Con-Pearl™ product, for example the Con-Pearl™ "Allround" product supplied by Con-Pearl North America Inc. In an alternative embodiment, the platform member may be an injection moulded plastic tray.

In an exemplary embodiment each support beam comprises at least one platform member locating feature configured to restrict lifting of the platform member from the support beams in an installed position. In an exemplary embodiment the platform member locating feature comprises a protrusion, and the platform member comprises a locating flange configured to be provided below the protrusion in the installed position.

In an exemplary embodiment the platform member comprises a flexible sheet material. In exemplary embodiments the flexible sheet material is a textile, for example an amarid based textile (more particularly a para-amarid fibre textile such as Kevlar™, supplied by DuPont), or a silicone rubber coated glass fabric.

In an exemplary embodiment the support beam comprises a winding shaft about which the flexible sheet is wound in a retracted condition. In an exemplary embodiment the flexible sheet is retractable into the support beam. In an exemplary embodiment the support beam comprises a storage cavity in which the winding shaft is provided. In an exemplary embodiment the support beam comprises a retraction mechanism configured to bias rotation of the winding shaft in a direction so as to retract the flexible sheet. In an exemplary embodiment the support beam comprises a manual tensioning mechanism for tensioning of the flexible sheet. In an exemplary embodiment the support beam comprises a sheet locking mechanism for locking off the flexible sheet at a desired length of extraction from the winding shaft.

In an exemplary embodiment the flexible sheet comprises a first sheet locating feature configured to interface with a second sheet locating feature of a neighbouring support beam. In an exemplary embodiment the first sheet locating feature is a bead on an edge of the sheet, and the second sheet locating feature is a hook or a keder rail.

In an exemplary embodiment the system is configured to avoid resonance in the platform member. In exemplary embodiments the natural frequency of the system may be tuned by adjusting the unsupported span of the platform member. In exemplary embodiments the natural frequency of the system may be tuned by adjusting the length of the spacer bars and/or the distance between adjacent spacer bars.

In an exemplary embodiment the cargo storage system comprises a first pair of rails and a second pair of rails, wherein the first pair of rails is provided above the second pair of rails within the cargo storage area. In an exemplary embodiment the cargo storage system comprises a pair of transition rails between first ends of the first pair of rails and first ends of the second pair of rails. In an exemplary embodiment the transition rails curve in an arc between the ends of the first pair of rails and the ends of the second pair of rails. In an exemplary embodiment the first pair of rails is provided in close proximity to the second pair of rails. In an exemplary embodiment the cargo storage system may be provided proximate the floor of the cargo storage area. In an exemplary embodiment the cargo storage system may be provided in an elevated position above the floor of the cargo storage area.

According to one aspect of the present technology there is provided a cargo storage system comprising a conveyor belt configured to extend along a length of the cargo storage area in a horizontal direction. In an exemplary embodiment the conveyor belt is configured to extend across a substantial portion of the width of the cargo storage area.

In an exemplary embodiment the belt of the conveyor belt may be made of a textile, for example an amarid based textile (more particularly a para-amarid fibre textile such as Kevlar™, supplied by DuPont), or a silicone rubber coated glass fabric.

In an exemplary embodiment the system may comprise internal lateral supports supporting the upper side of the belt. In exemplary embodiments the lateral supports may comprise beams. In exemplary embodiments the lateral supports may comprise rollers. In an exemplary embodiment the system is configured to avoid resonance in the belt. In exemplary embodiments the natural frequency of the system may be tuned by adjusting the unsupported span of the belt. In exemplary embodiments the natural frequency of the system may be tuned by adjusting the spacing between the lateral supports.

In an exemplary embodiment the conveyor belt may comprise an external support element. In an exemplary embodiment the support element may comprise a vertical flange extending from an outer surface of the conveyor belt.

In an exemplary embodiment the conveyor belt may be driven, for example by an electric motor. In an exemplary embodiment the conveyor belt may be manually moved, for example via a ratchet system, hand wheels, or direct pushing/pulling by an operator.

The above and other features will become apparent from the following description and the attached drawings.

BRIEF DESCRIPTION OF THE DRAWINGS

Further aspects of the present invention will become apparent from the ensuing description which is given by way of example only and with reference to the accompanying drawings in which:

FIG. 1-2 is a perspective view of the first cargo storage system;

FIG. 2-1 is a side view of an exemplary second cargo storage system installed in a cargo storage area of a cargo vehicle;

FIG. 2-2 is a perspective view of the second cargo storage system;

FIG. 3-1 is a perspective view of an exemplary track guide assembly;

FIG. 3-2 is a perspective exploded view of the track guide assembly;

FIG. 4-1 is an end view of an exemplary load rail profile;

FIG. 4-2 is an end view of the track guide assembly supported by the exemplary load rail profile;

FIG. 4-3 is a perspective view of the track guide assembly supported by the exemplary load rail profile;

FIG. 6-1 is an end view of an exemplary support beam extrusion;

FIG. 6-2 is a perspective view of the support beam extrusion;

FIG. 8-1 is a first perspective view of a support platform comprising a plurality of the support beams;

FIG. 8-2 is a second perspective view of the support platform;

FIG. 9-1 is a perspective view of an exemplary rigid panel;

FIG. 9-2 is a perspective view of an exemplary support platform comprising two of the rigid panels connected between two support beams;

FIG. 9-3 is an end view of the support platform;

FIG. 9-4 to 9-8 are side views of the support platform in various stages of disassembly;

FIG. 10-1 is a perspective view of an exemplary support platform comprising a retractable sheet;

FIG. 10-2 is an end view of the support platform;

FIG. 10-3 is a perspective view of the support platform with the sheet retracted;

FIG. 11-1 is a perspective view of a third exemplary cargo storage system;

FIG. 11-2 is a perspective view of the third cargo storage system with retractable sheets deployed;

FIG. 11-3 is a side view of the third cargo system installed in a cargo van;

FIG. 12-1 is a perspective view of a fourth exemplary cargo storage system;

FIG. 12-2 is a perspective view of the fourth cargo storage system with a vertical flange moved from a forward position;

FIG. 12-3 is a side view of the fourth cargo system installed in a cargo van;

DETAILED DESCRIPTION

Figure 1:
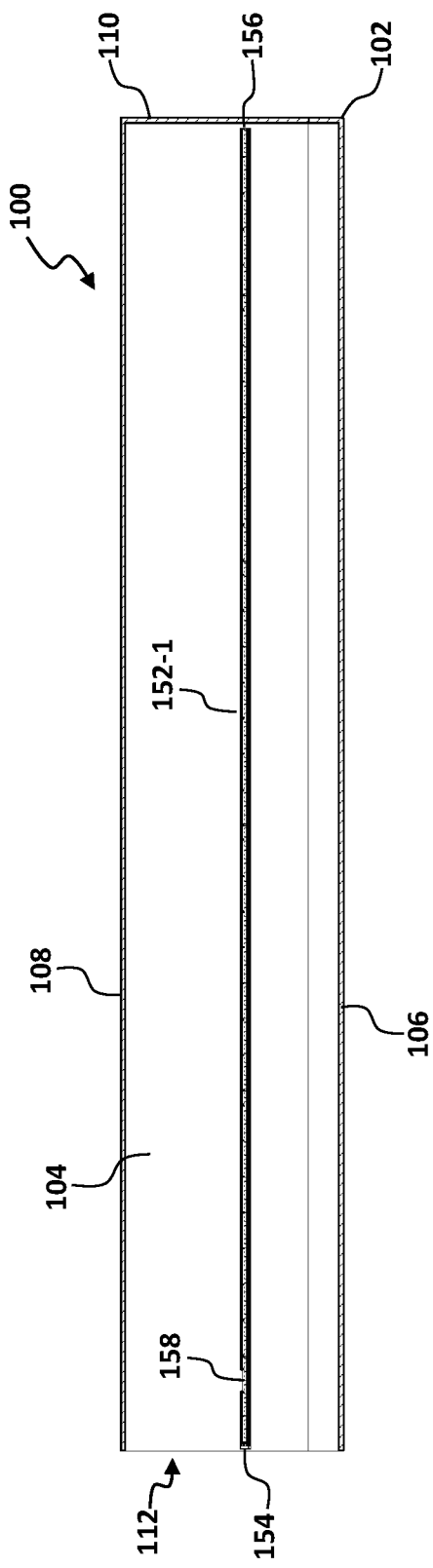
FIG. 1-1 is a side view of an exemplary first cargo storage system installed in a cargo storage area of a cargo vehicle.
Figures 1, 2:
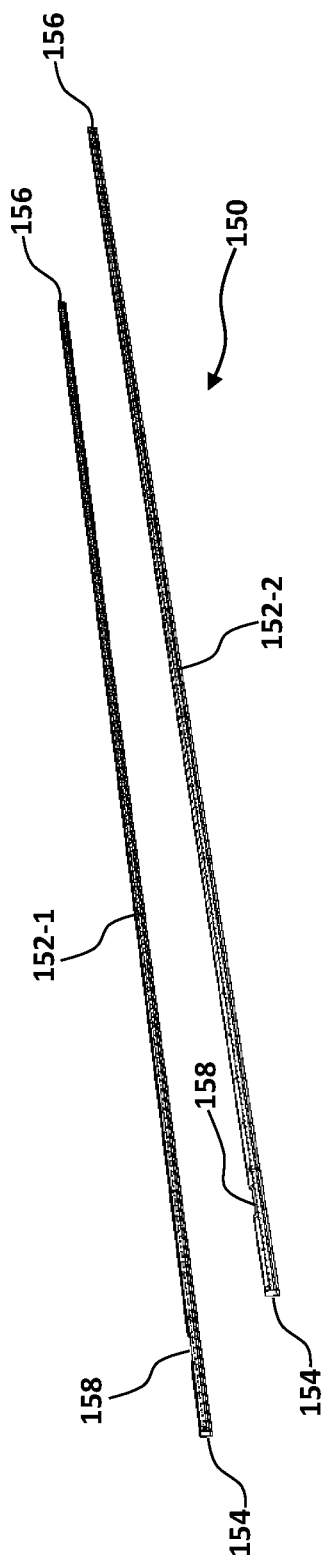
Figures 1, 2:
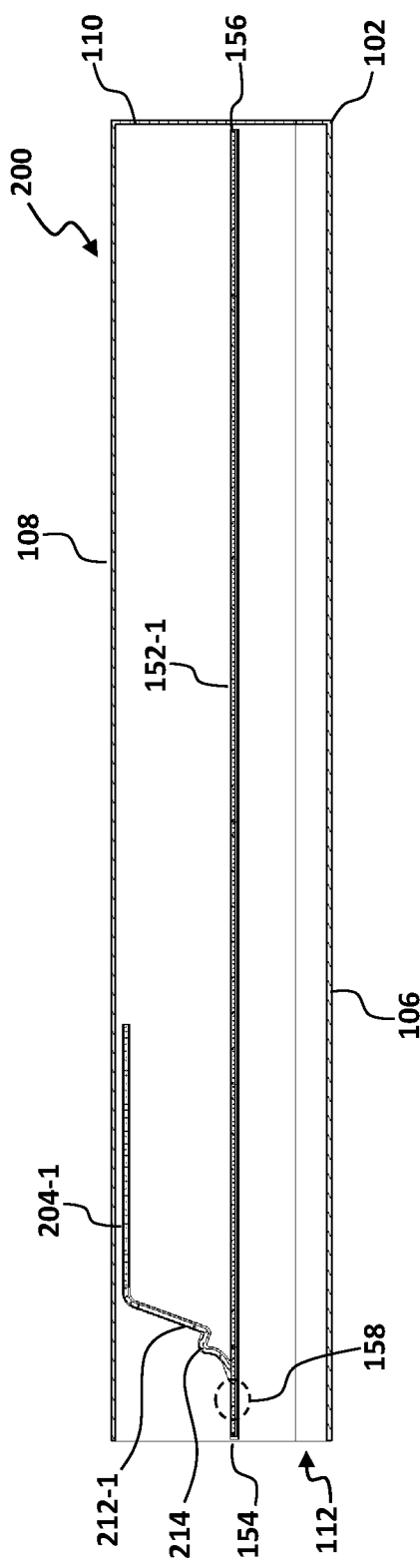
Figure 2:
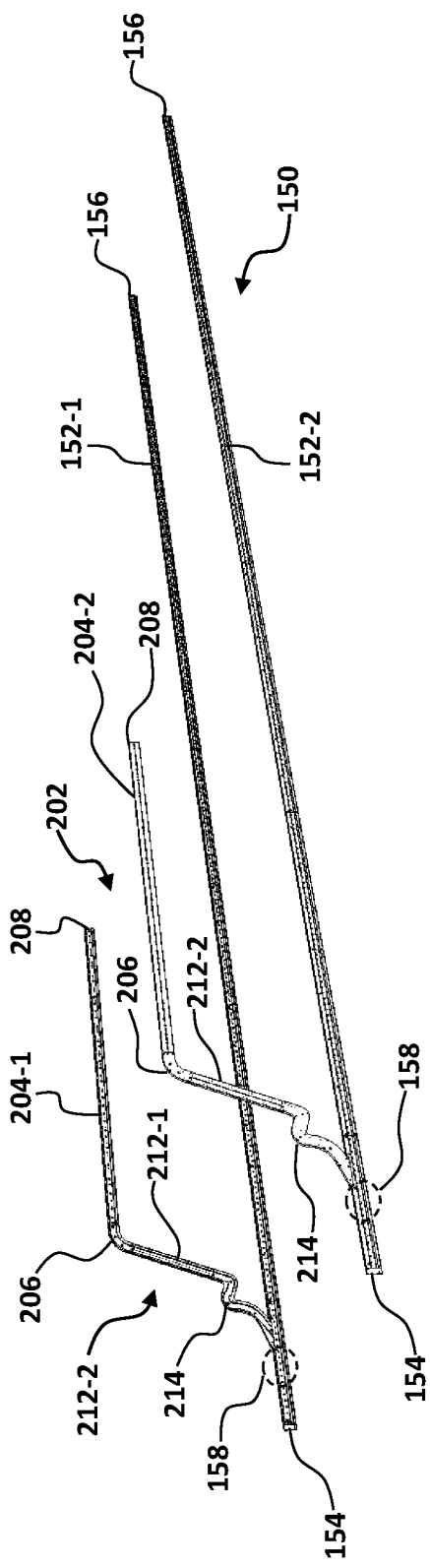

FIG. 1-1 illustrates a first cargo storage system 100 installed in a cargo storage area 102 of a cargo vehicle (not illustrated). The cargo storage area 102 is defined by side walls 104, floor 106, ceiling 108, a forward end wall 110, and a rearward end 112 which is shown in an open condition, but may be closed (for example by a door or doors). Referring to FIG. 1-2, the first cargo storage system 100 comprises a first pair 150 of rails, comprising first load rail 152-1 and second load rail 152-2 (referred to herein as load rails 152), each rail 152 having a first end 154 and a second end 156. The load rails 152 have enclosed tracks to receive track guides of support beams, as will be described further below. In the exemplary embodiment illustrated, entry into the enclosed track from the first end 154 and/or second end 156 of each load rail 152 is blocked (for example by end caps). Instead, each of the load rails 152 comprises a drop in beam opening 158 on an upper side of the load rail 152, leading into the enclosed track in order to allow support beams to be introduced to, and retrieved from, the load rails 152. In the exemplary embodiment illustrated, the drop in beam openings 158 are provided proximate to, but offset from, the first ends 154 of the load rails 152. This allows a user to stand on the floor 106 of the cargo storage area 102 between the load rails 152 while inserting the support beams into, or retrieving them from, the drop in beam openings 158—while also maximizing the useful length of the load rails 152 in use, as will become more evident from the description below.

FIG. 2-1 illustrates a second cargo storage system 200 installed in a cargo storage area 102 substantially as described above with reference to FIG. 1-2. Referring to FIG. 2-2, the second cargo storage system 200 comprises a first pair 150 of rails comprising first load rail 152-1 and second load rail 152-2, substantially as described above with reference to FIG. 1-1 and FIG. 1-2. The second cargo storage system 200 further comprises a second pair 202 of rails, comprising first storage rail 204-1 and second storage rail 204-2 (referred to herein as storage rails 204), each storage rail 204 having a first end 206 and a second end 208. Similar to the load rails 152, the storage rails 204 have enclosed tracks to receive track guides of support beams, as will be described further below. In the exemplary embodiment illustrated, entry into the enclosed track from the second end 208 of each storage rail 204 is blocked (for example by end caps).

The storage rails 204 are provided above the load rails 152, at a height proximate the ceiling 108 of the cargo storage area 102. The second cargo storage system 200 comprises a third pair 210 of rails, comprising first transition rail 212-1 and second transition rail 212-2 (referred to herein as transition rails 212). The transition rails 212 also have enclosed tracks to receive track guides of support beams, and facilitate the transfer of support beams between the load rails 152 and the storage rails 204. In the embodiment illustrated, the transition rails 212 follow a nonvertical path between the first ends 206 of the storage rails 204 and points offset from the first ends 154 of the load rails 152 at which a junction is formed across which the support beams can be transferred. In the embodiment illustrated, the transition rails 212 enter the junctions at an acute angle relative to the portions of the load rails 152 extending from the junctions towards the second ends 156.

In the embodiment illustrated, each transition rail 212 comprises a safety station 214 configured to present a tortuous section to a support beam passing through it, particularly to interrupt or at least slow unrestrained descent of a support beam from the storage rails 204 to the load rails 152. In this embodiment, the enclosed track through the safety station 214 has a reverse curvature.

In exemplary embodiments, each of the load rails 152 may comprise a drop in beam opening 158 on an upper side of the load rail 152. In exemplary embodiments the drop in beam openings 158 may be provided between the junctions and the first ends 154 of the load rails 152—although it is expressly noted that alternative locations are contemplated, for example in the safety stations 214.

In some use cases, it may be beneficial to permanently retain the support beams within the system 200. However, the ability to easily remove beams from the system 200 on demand is envisaged as providing benefits in other cases. For example, the support beams may contribute a significant proportion of the total mass of the system 200. Being able to remove the beams to increase the load capacity of the cargo vehicle may be valuable, especially if the vehicle is to be used in this configuration (i.e. without support beams, or with a lower number of beams) for an extended period of time. Further, the stored support beams may occupy volume, or limit the height, of the cargo storage area—removal of the support beams where otherwise not required may assist with recovering this space. The beams may be stored at a vehicle depot, or potentially used in another vehicle that has the system 200 fitted. For entities operating a number of cargo vehicles with the system 100 and/or system 200 fitted, this may allow for distribution of the support beams on a case by case basis—potentially reducing the total number of support beams required by that entity (with associated benefits in terms of costs and storage space required).

Figures 1, 3:
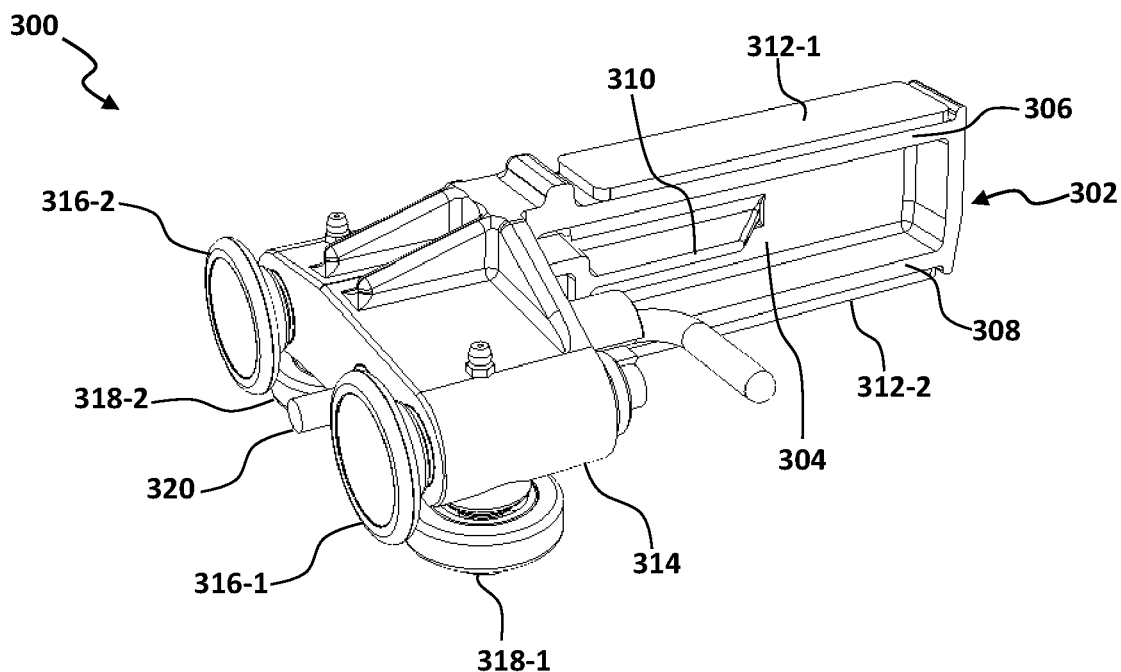
Figures 2, 3:
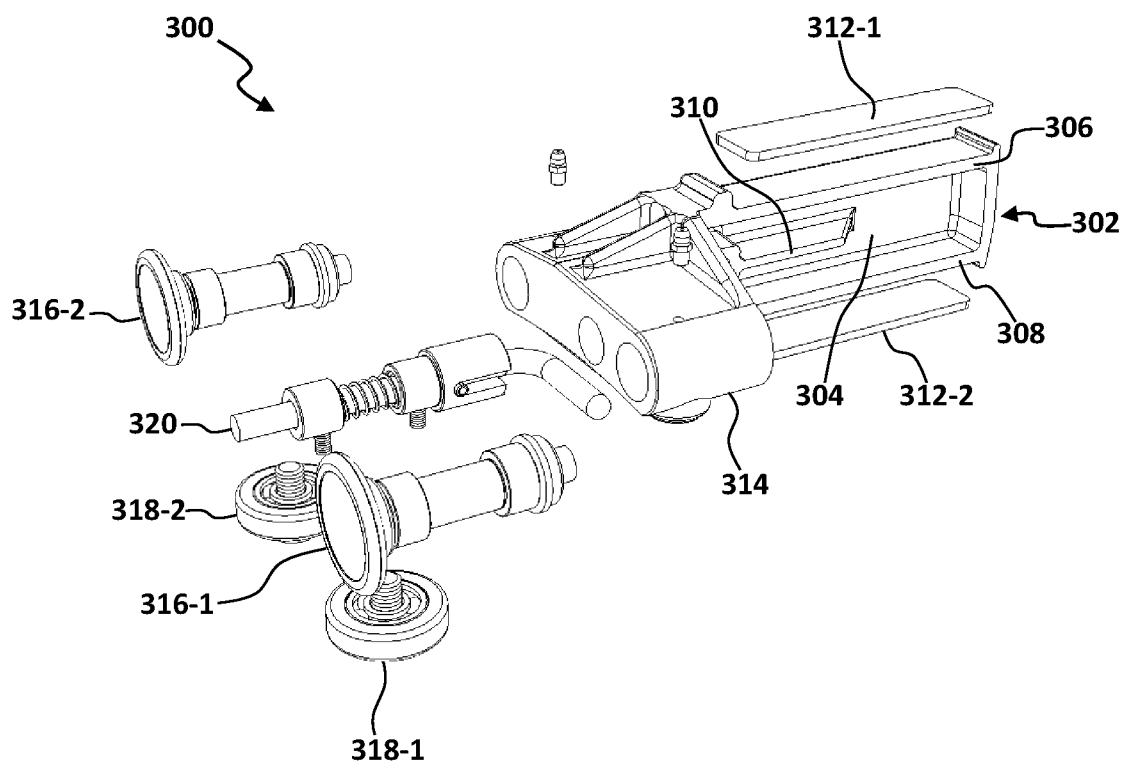

FIG. 3-1 and FIG. 3-2 illustrate an exemplary embodiment of a track guide assembly 300 for use with support beams of the present disclosure. The track guide assembly 300 comprises a beam insert portion 302, comprising a side wall 304, upper wall 306, lower wall 308, and central fin 310, configured to be received within an internal cavity of the support beam. Replaceable load plates 312-1 and 312-2 are provided on the upper wall 306 and lower wall 308 respectively.

A roller mounting portion 314 is formed in a monolithic structure with the beam insert portion 302 (for example, as a casting). First load roller 316-1 and second load roller 316-2 are mounted to the roller mounting portion 314 to be in a vertical orientation in use, and first side roller 318-1 and second side roller 318-2 are mounted to the roller mounting portion 314 to be in a horizontal orientation in use. A retractable locking pin 320 extends through the roller mounting portion 314 between the first load roller 316-1 and second load roller 316-2.

Figures 1, 4:
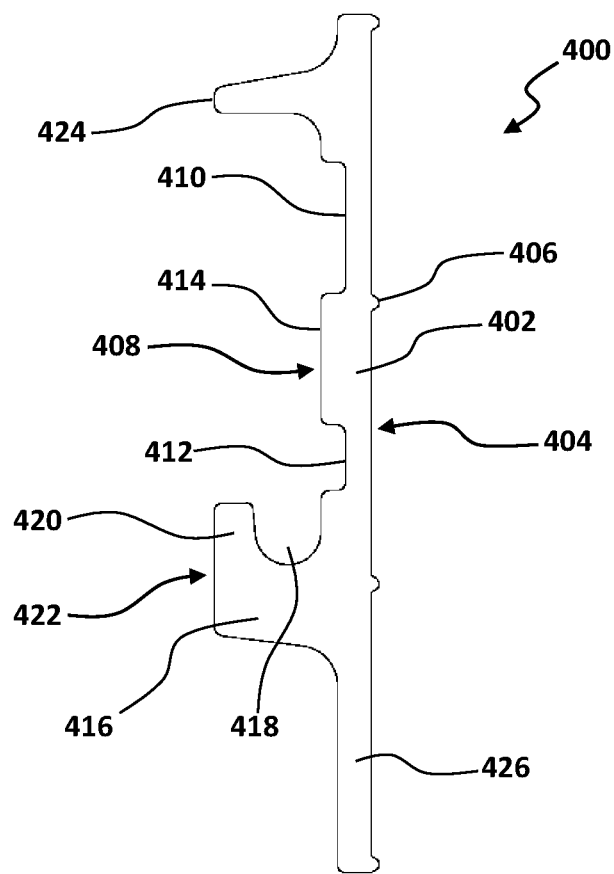
Figures 2, 4:
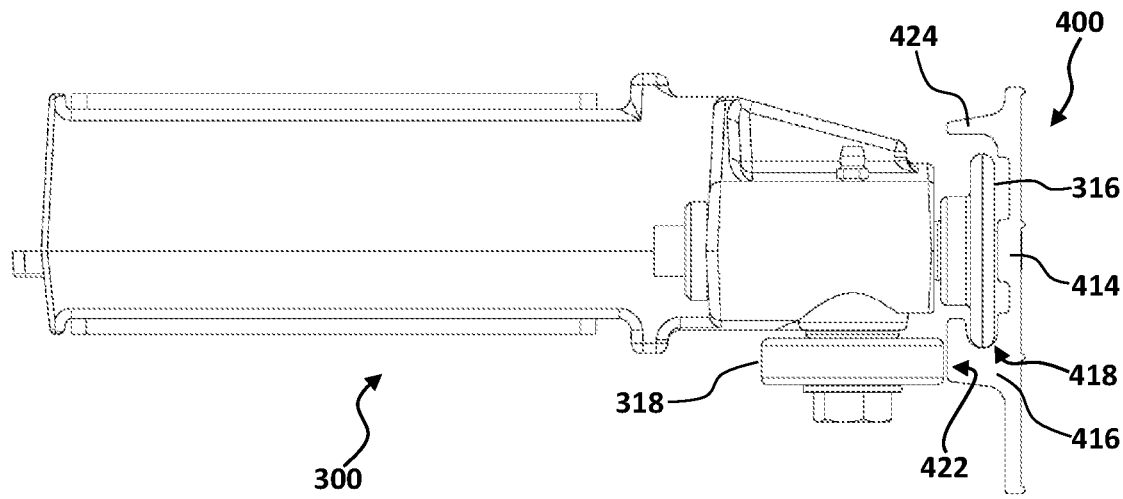
Figures 3, 4:
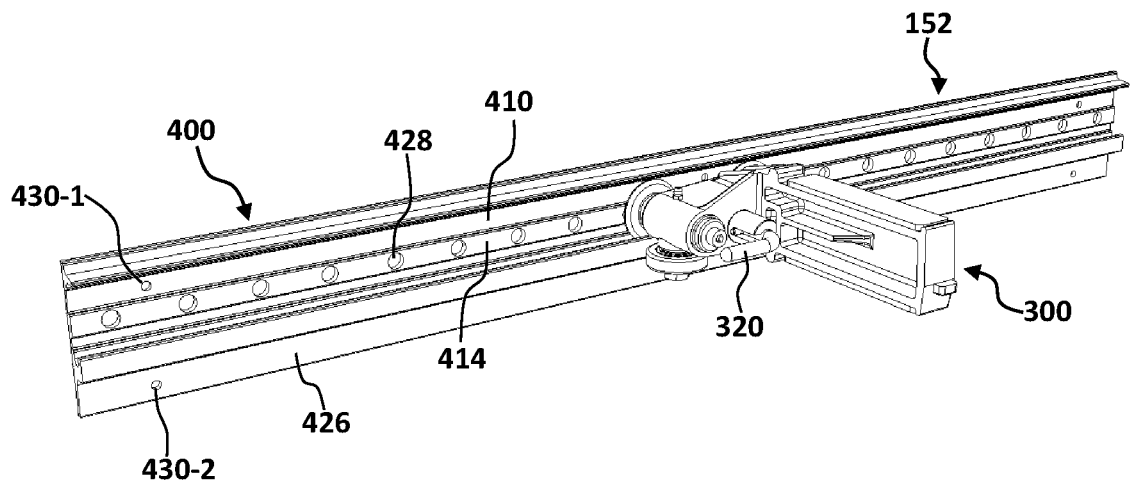

FIG. 4-1 shows an exemplary load rail profile 400, for use in load rails 152 of the first cargo storage system 100 or the second cargo storage system 200. The load rail profile 400 comprises a side section 402 having a wall facing surface 404 with a plurality of spacer features 406. On the opposing side of the side section 402 is a track cavity side surface 408 comprising an upper side recess 410 and a lower side recess 412, with a thicker portion 414 therebetween. A lower section 416 protrudes from the side section 402 below the lower side recess 412. A roller recess 418 is provided in an upward facing surface of the lower section 416, forming an outer lip 420. An outer guide surface 422 is provided on the lower section 416. An upper section 424 protrudes from the side section 402 above the upper side recess 410. The track cavity side surface 408, downward facing surface of the upper section 424, and roller recess 418 of the lower section 416 define an enclosed track cavity. The side section 402 extends below the lower section 416 in a side section extension 426.

Referring to FIG. 4-2, the load rollers 316 are received within the enclosed track cavity, such that the rims of the load rollers 316 rest on the roller recess 418. The overhanging upper section 424 restricts lifting of the load rollers 316 out of the roller recess 418. The side rollers 318 bear against outer guide surface 422, limiting lateral forces which might otherwise cause damage to the track guide assembly 300. The overhanging upper section 424 has more of a thin wall construction than the lower section 416, as loading in use is primarily born by the lower section 416.

As shown in FIG. 4-3, the load rail profile 400 comprises locking pin features in the form of blind holes 428 along the thicker portion 414 of the side section 402. The locking pin 320 may be selectively engaged with one of the blind holes 428 to maintain the position of the track guide assembly 300 (and therefore support beam) on the load rail 152.

During installation of the load rails 152, an adhesive may be applied between the wall facing surface 404 and side wall 104. The spacer features 406 assist with ensuring a predetermined thickness of adhesive is maintained, while the side section extension 426 provides an increased surface area of the wall facing surface 404, to provide sufficient load bearing strength when adhered to a side wall 104. In exemplary embodiments, upper fastener holes 430-1 may be provided in the upper side recess 410, and lower fastener holes 430-2 provided in the side section extension 426. Fasteners, for example rivets, may be passed through the fastener holes 430 into the side wall 104 and/or support framework of the side wall 104. Heads of fasteners through the upper fastener holes 430-1 sit within the upper side recess 410 to prevent interference with the load wheels 316.

Figure 5:
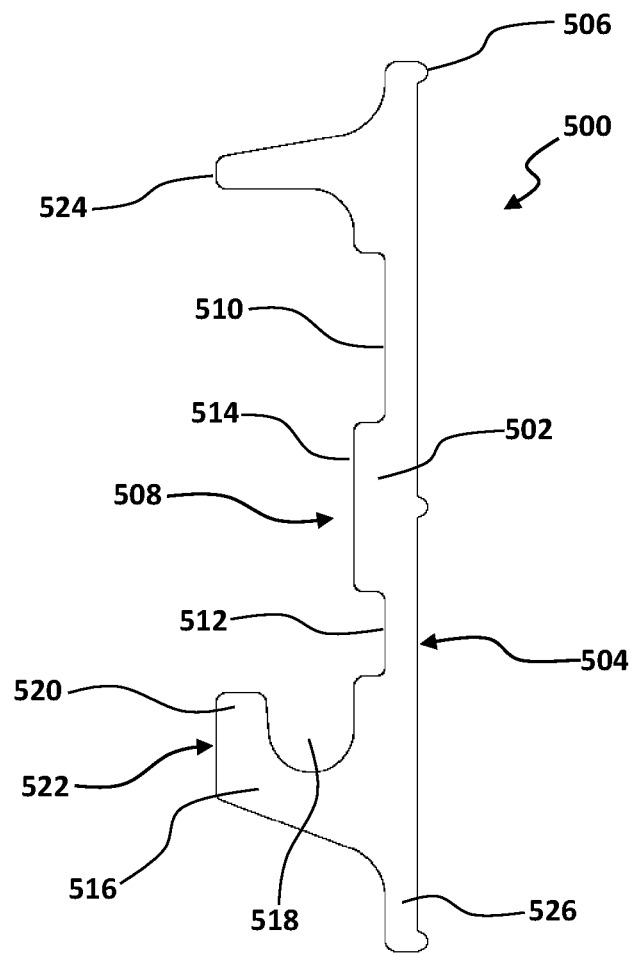
FIG. 5 is an end view of an exemplary support rail profile.

FIG. 5 shows an exemplary storage rail profile 500, for use in storage rails 204 of the second cargo storage system 200. The storage rail profile 500 is configured in a similar manner to load rail profile 400, comprising a side section 502 having a wall facing surface 504 with a plurality of spacer features 506. On the opposing side of the side section 502 is a track cavity side surface 508 comprising an upper side recess 510 and a lower side recess 512, with a thicker portion 514 therebetween. A lower section 516 protrudes from the side section 502 below the lower side recess 512. A roller recess 518 is provided in an upward facing surface of the lower section 516, forming an outer lip 520. An outer guide surface 522 is provided on the lower section 516. An upper section 524 protrudes from the side section 502 above the upper side recess 510. The track cavity side surface 508, downward facing surface of the upper section 524, and roller recess 518 of the lower section 516 define an enclosed track cavity. The side section 502 extends below the lower section 516 in a side section extension 526.

In comparison with the load rail profile 400, the storage rail profile 500 is exposed to significantly lower loading forces (from both the load rollers 316 and the side rollers 318). As such, it is envisaged that the thickness of the lower section 516 may be less than that of the lower section 416, and the surface area of outer guide surface 522 may also be less than that of outer guide surface 422. Further, the length of the side section extension 526 may be less than side section extension 426.

Figures 1, 6:
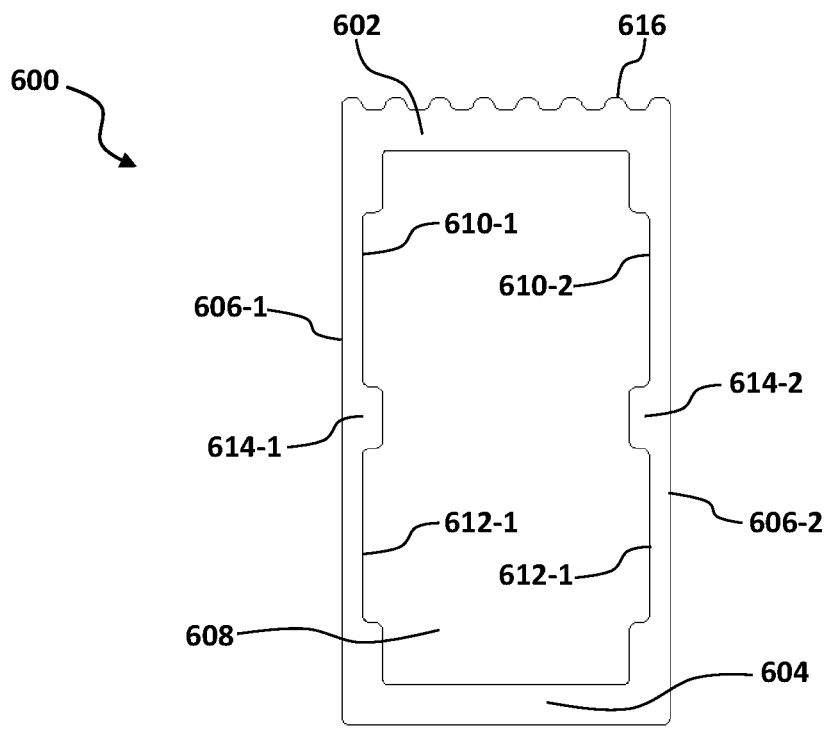
Figures 2, 6:
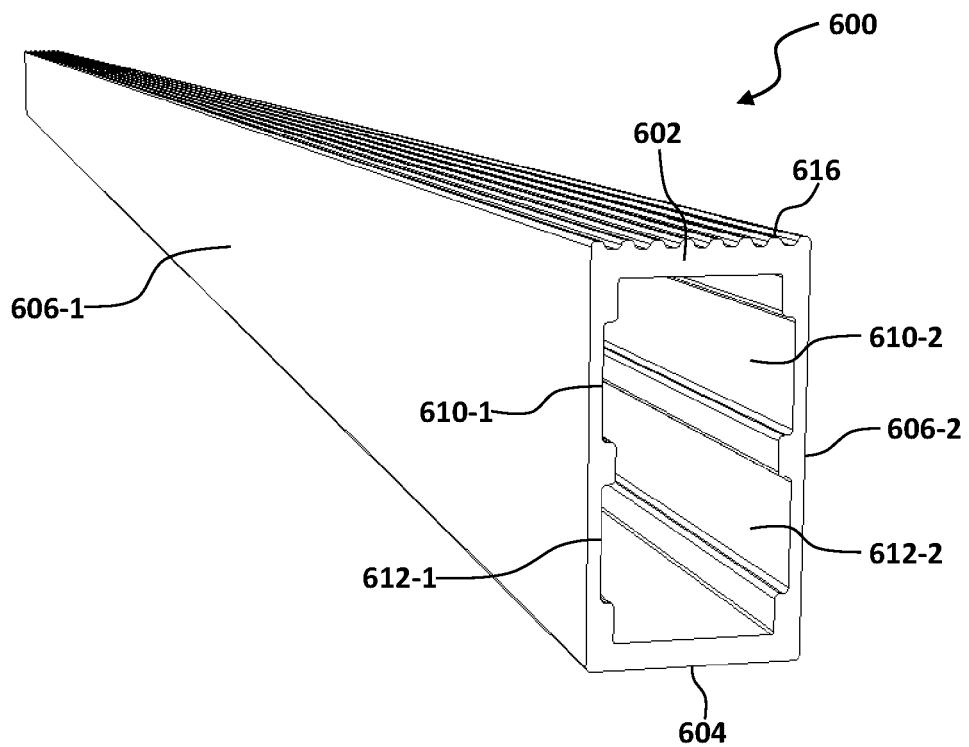

FIG. 6-1 and FIG. 6-2 show an exemplary support beam extrusion 600. The extrusion 600 has a hollow structural section comprising an upper wall 602, a lower wall 604, a first side wall 606-1, and a second side wall 606-2 defining an internal cavity 608. Each side wall 606 comprises an upper internal recess 610 and a lower internal recess 612, having a thicker section 614 between them. In use, the internal cavity 608 receives the beam insert portion 302 of the track guide assembly 300. The side wall 304 of the track guide assembly 300 bears against the raised surfaces of the first side wall 606-1 of the extrusion 600. Similarly, the sides of the upper wall 306, lower wall 308, and central fin 310 of the track guide assembly 300 respectively bear against the second side wall 606-2 above, below, and between the upper internal recess 610-2 and a lower internal recess 612-2. The thicker sections 614 of each side wall also allow for tapped fastener holes (not illustrated) to be provided, and used to secure brackets (for example, mounting bracket 704, stowing bracket 706, and receiving brackets 708 discussed below) to the extrusion 600 using a threaded fastener.

In the exemplary embodiment shown, the upward facing surface of the upper wall 602 of the beam extrusion 600 comprises a plurality of ridges in the form of castellations 616 across its width. In this example the height of each castellation 616 is about 1.5 mm, and the width of each ridge is about 2.5 mm. The castellations assist with reducing the likelihood of ice formation on the loading surface (for example, due to condensation freezing within a refrigerated cargo stage area, or when operated in freezing conditions) presenting a slick surface to cargo placed on it. The castellations may function to provide a volume away from the support surface for ice to form, and/or to assist with breaking up the ice against cargo loaded onto the support beams.

Figure 7:
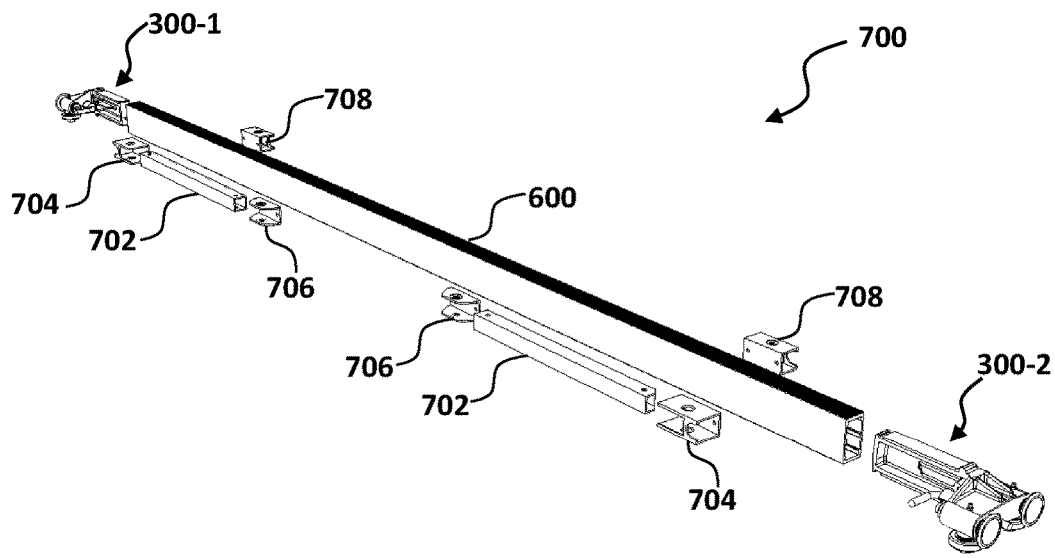
FIG. 7 is a perspective exploded view of an exemplary support beam.

FIG. 7 illustrates an exemplary support beam 700 (in an exploded view), comprising a length of the beam extrusion 600, with a first track guide assembly 300-1 inserted at a first end, and a second track guide assembly 300-2 inserted at a second end distal from the first end.

Figures 1, 8:
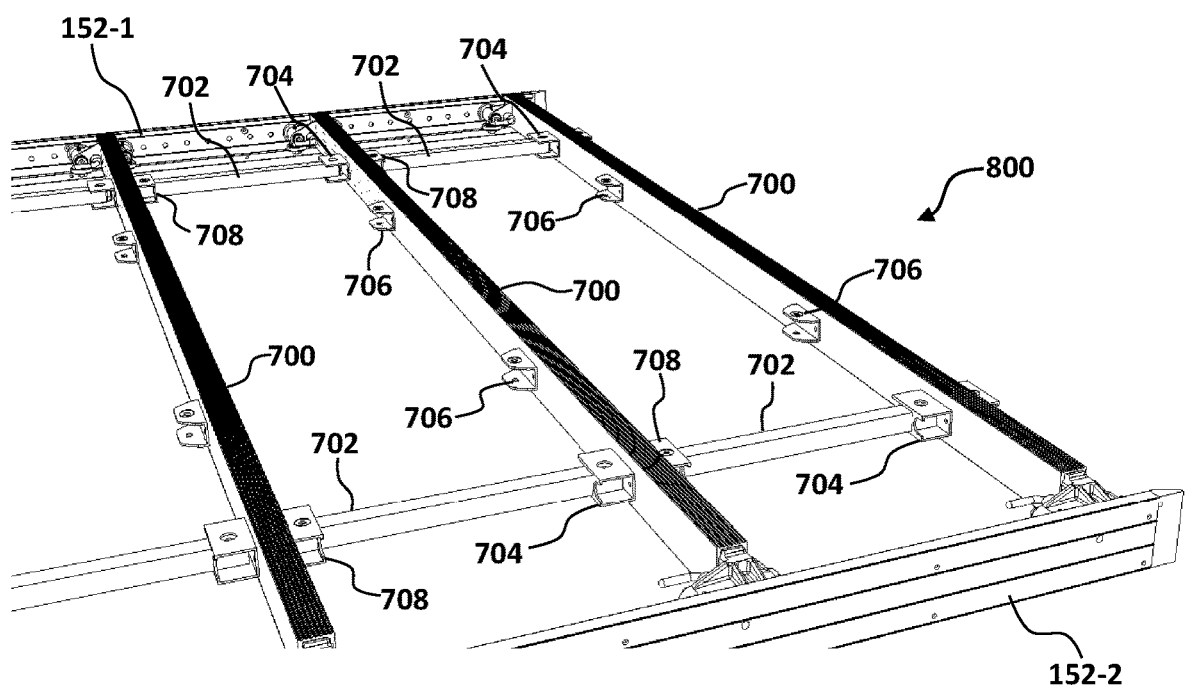
Figures 2, 8:
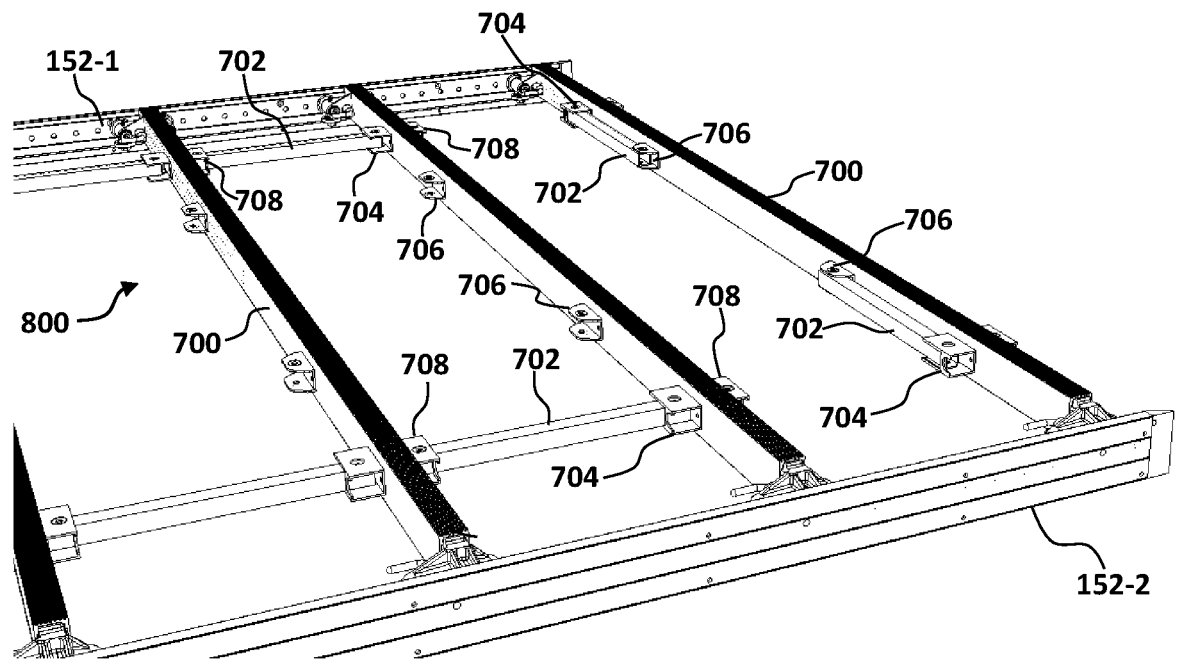

The support beam 700 comprises spacer beams 702, each being pivotally secured to a side wall of the beam extrusion 600 using a mounting bracket 704, and selectively held against the beam extrusion using a stowing bracket 706. On the opposing side wall of the beam extrusion 600, receiving brackets 708 are provided to receive ends of spacer beams 702 from neighboring support beams 700. FIG. 8-1 illustrates a plurality of support beams 700 mounted on load rails 152, secured relative to each other using the spacer beams 702 to provide a support platform 800 onto which cargo may be loaded (whether directly, or via pallets loaded onto the support platform 800). FIG. 8-2 illustrates one of the support beams 700 released from the neighboring support beam 700 and the remaining support platform 800, allowing for independent movement along the load rails 152.

Figures 1, 9:
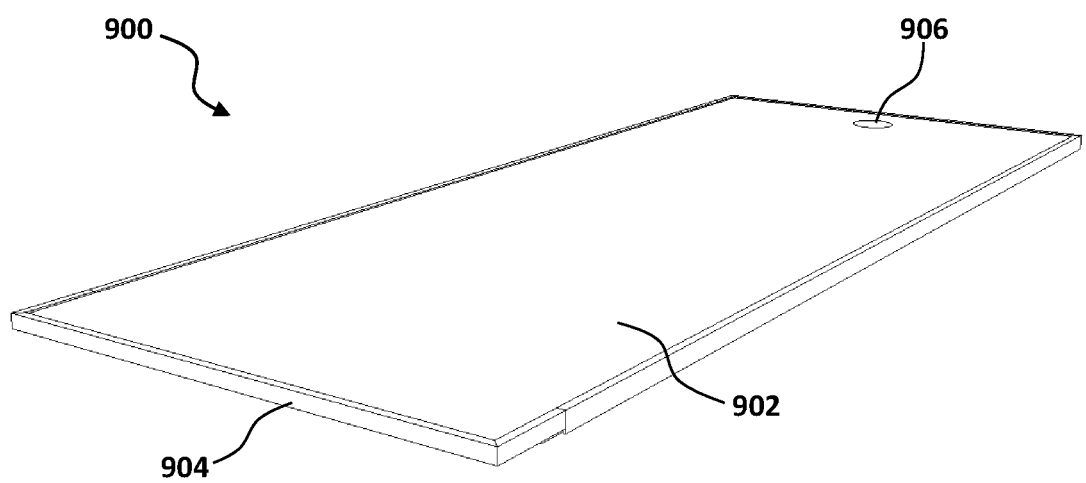
Figures 2, 9:
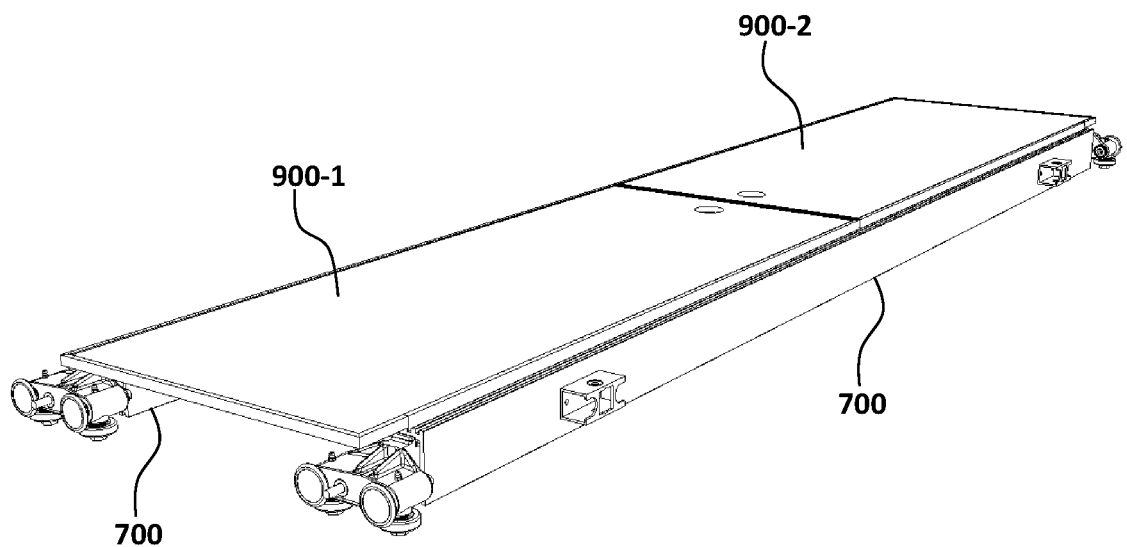
Figures 3, 9:
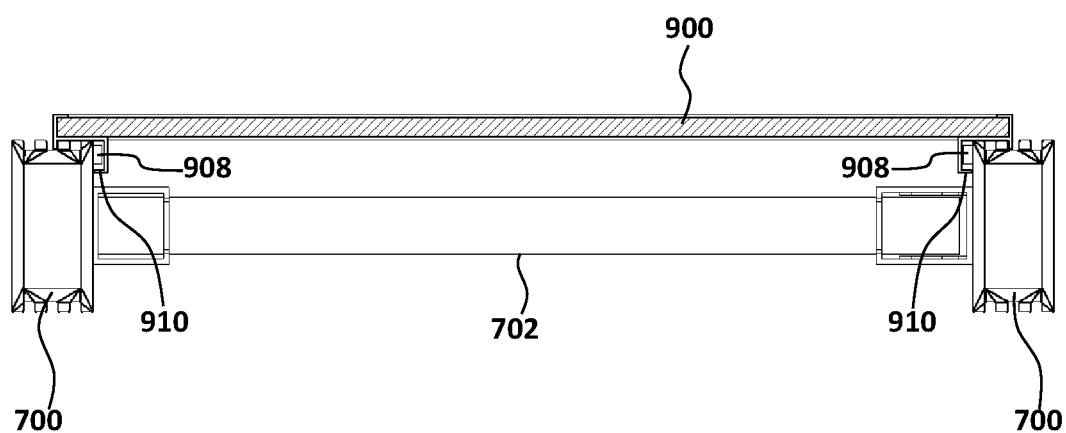
Figures 4, 9:
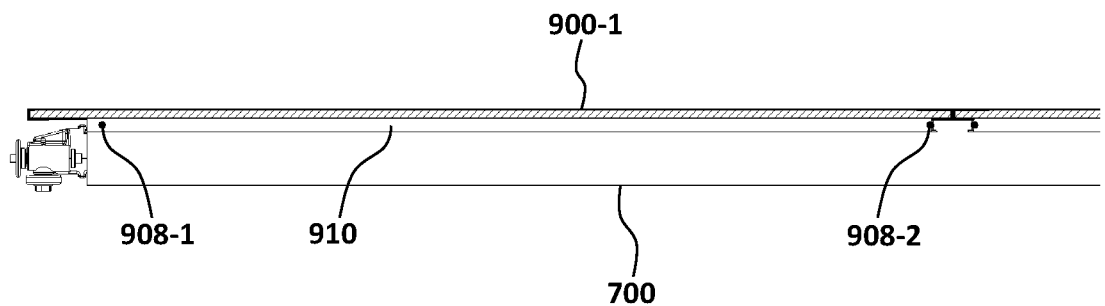
Figures 5, 9:
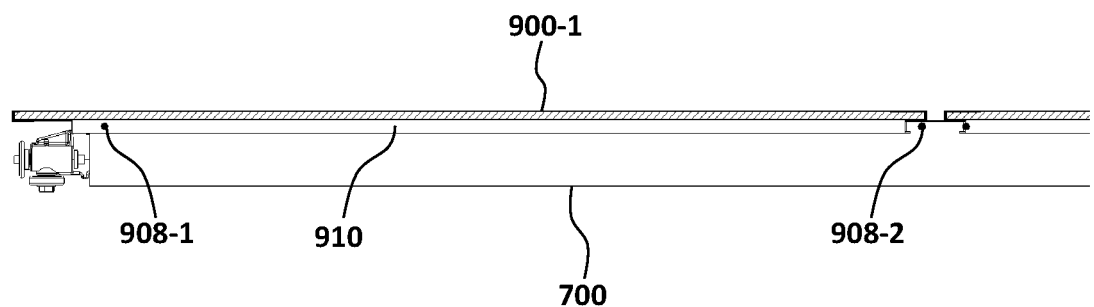
Figures 6, 9:
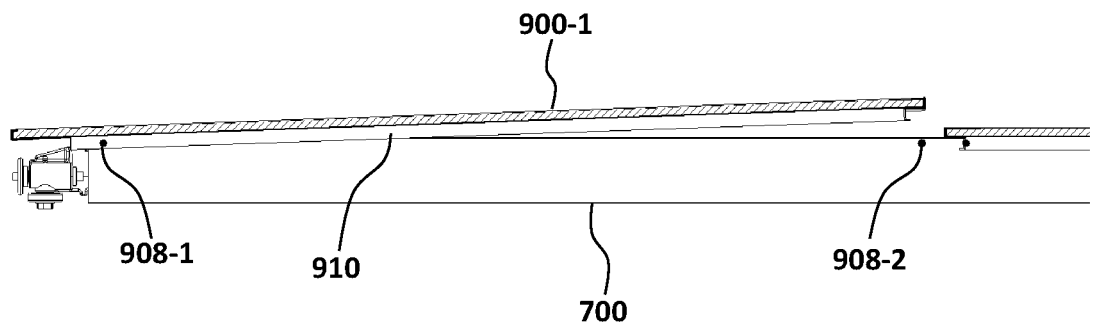
Figures 7, 9:
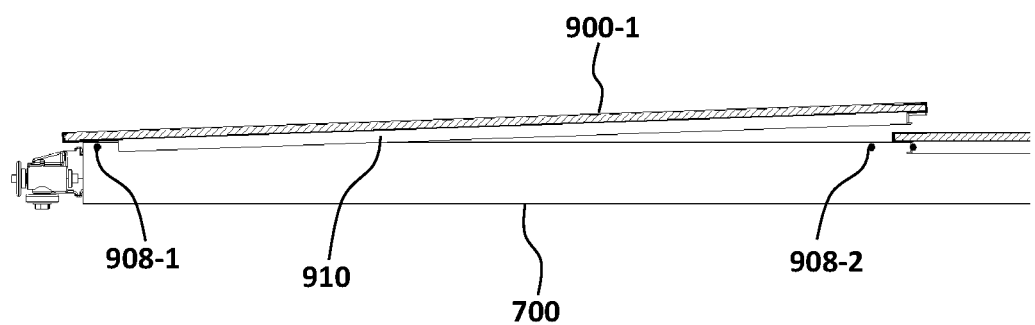
Figures 8, 9:
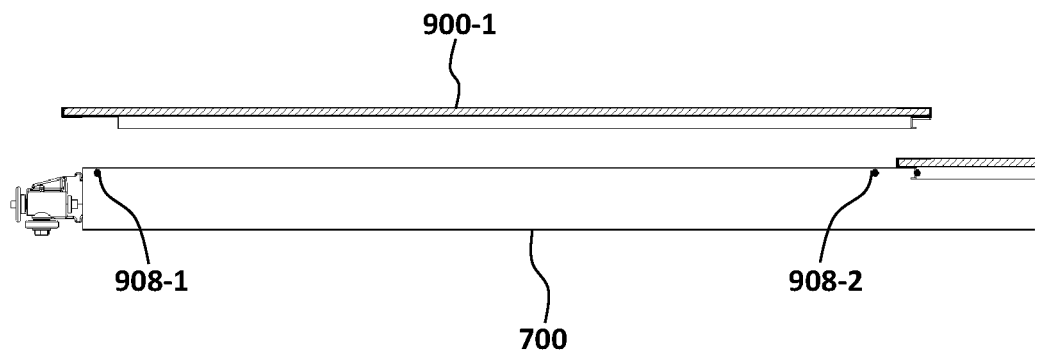

FIG. 9-1 shows a platform member in the form of a rigid panel 900 according to one form of the present disclosure. The panel 900 comprises a main body 902, for example made of a polycarbonate sandwich panel such as the Con-Pearl™ "Allround" product. This material has a very high specific stiffness and specific strength, while being light in weight and having a hard-wearing surface. Also, the material can be fitted with a range of standardised fasteners for attaching straps, ropes and other fixings to. The main body 902 is edged by an extrusion 904 (secured, for example, using an adhesive), and has a hand hole 906—in this example disposed towards one end of the main body 902. Referring to FIG. 9-2, first panel 900-1 and second panel 900-2 are positioned to span between neighbouring support beams 700. In use, cargo may be loaded onto the panels 900 (rather than directly onto the support beams or onto pallets loaded on the support beams).

In order to allow the system to be configured, and/or move support beams 700 when not in use, it is desirable that the panels 900 may be readily removeable. As shown in FIG. 9-3, the support beams 700 comprise panel locating features in the form of locating protrusions 908 on the sides of the support beams 700. The extrusion 904 of the panel 900 comprises a locating flange 910 configured to extend below and underneath the locating protrusions 908 in the installed position.

FIGS. 9-4 to 9-8 illustrates removal of one of the panels 900. In FIG. 9-4, the first panel 900-1 is in an installed position, with two spaced apart locating protrusions 908-1 and 908-2 within the locating flange 910 to restrict lifting of the panel 900-1 from the support beams 700. In FIG. 9-5, the first panel 900-1 has been slid away from the second panel 900-2 such that the second locating protrusion 908-2 is no longer within the locating flange 910, allowing for lifting of the first panel 900-1 at that end, as shown in FIG. 9-6. The first panel 900-1 may then be slid in the reverse direction such that the first locating protrusion 908-1 is no longer within the locating flange 910 (as shown in FIG. 9-7), and then lifted clear of the support beams 700 (as shown in FIG. 9-8).

Figures 1, 10:
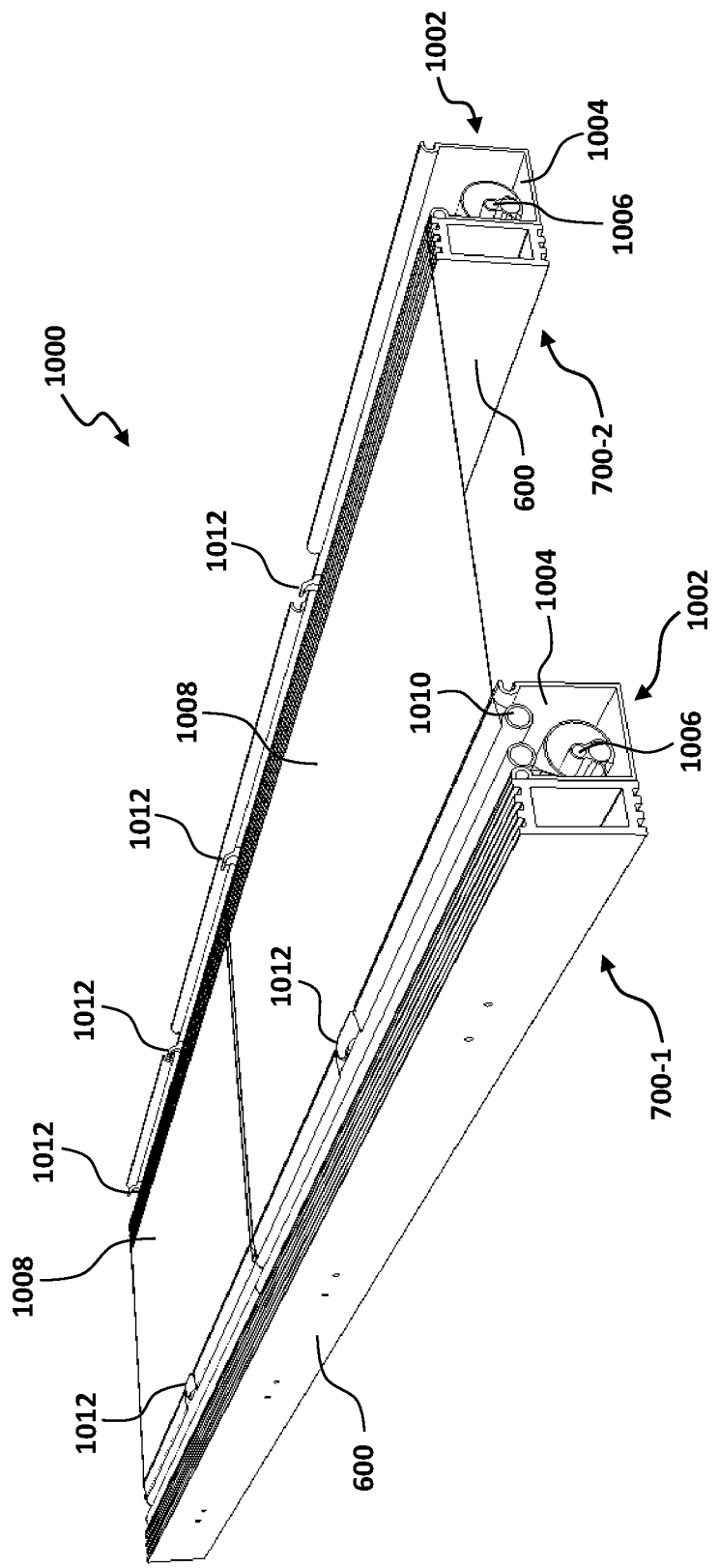
Figures 2, 10:
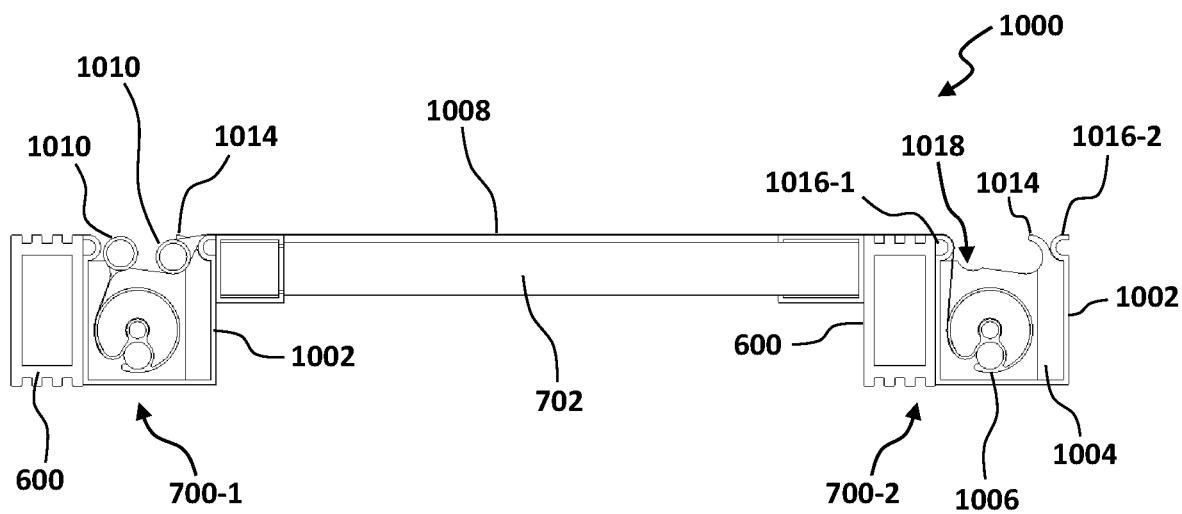
Figures 3, 10:
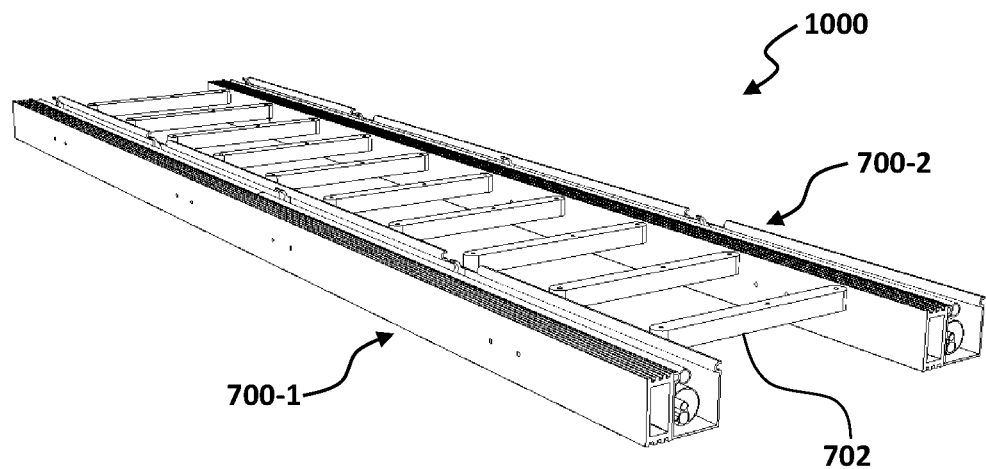

FIG. 10-1 to FIG. 10-3 illustrate another exemplary embodiment of the present disclosure for providing a support surface between neighbouring support beams. A retractable sheet system 1000 comprises a first support beam 700-1 and second support beam 700-2 spaced apart and secured by spacer beams 702. Each support beam 700 has a retractable sheet extrusion 1002 attached to one side, the combination of which may be referred to collectively as a support beam. The retractable sheet extrusion 1002 has an internal cavity 1004 in which at least one winding shaft 1006 is received.

Flexible sheets 1008 are secured to the winding shaft 1006. In embodiments the flexible sheet material is a textile, for example an amarid based textile (more particularly a para-amarid fibre textile such as Kevlar™, supplied by DuPont), or a silicone rubber coated glass fabric. A material such as Kevlar is considered well suited to the present application, having a stiffness sufficient to reduce the likelihood of the tensioned sheet behaving like a trampoline for cargo due to undamped spring behaviour. Abrasion resistance is also important as the sheet will have significant wear on the top and bottom surfaces as cargo is moved around. Impact resistance is also important, as there will be objects dropped or otherwise impacted on the surface of the sheets in the course of use.

A free end of each sheet 1008 has a bead 1010 along its edge, and hand holes 1012 at select locations against the bead 1010. The retractable sheet extrusion 1002 further comprises a plurality of hooks 1014, such that in use the flexible sheet 1008 may be pulled from the internal cavity 1004 of one support beam (for example second support beam 700-2), and the bead 1010 of the sheet 1008 secured to the hooks 1014 of a neighbouring support beam (for example, first support beam 700-1) to hold it in place. The inner rims 1016-1 and 1016-2 of the retractable sheet extrusion 1002 are rounded with a relatively large radii to assist with reducing wear on the sheet 1008. The retractable sheet extrusion 1002 further comprises a seat recess 1018 for locating the bead 1010 of the sheet 1008 when retracted into the internal cavity.

In exemplary embodiments, the winding shaft 1006 may be biased to retract the sheet 1008 when released. However, it is anticipated that achieving a desired level of tension in the sheet 1008 using such bias alone may be difficult while also allowing the sheets 1008 to be manually extended by a user relatively easily. It is anticipated that a user may pull approximately 100 N (~10 kg force) horizontally relatively easily, however it is anticipated that the required tension to support a mass of packages which may be experienced in some applications is greater than 1,000 N (~100 kg force). As such, it is envisaged that a manual tensioning mechanism for tensioning of the sheets 1008 may be provided (for example, a ratchet mechanism). In an exemplary embodiment, a sheet locking mechanism may be provided for locking off the sheets 1008 at a desired length.

In system 1000, the spacer beams 702 are located such that their upper support surface is substantially adjacent to the sheet 1008 when connected between the support beams 700. It is envisaged that this may assist with supporting the sheet 1008 to control deflection of the sheet 1008 and distribute the loading forces.

Mass sitting on a tensioned sheet results in undamped sprung motion. It is anticipated that matching of the frequency of this motion with a fundamental frequency of a cargo vehicle in motion may result in resonance, imparting significantly more loading on the overall system, and increasing the risk of cargo moving and potentially collapsing if stacked. As such, it is desirable to avoid this scenario. The resonant frequency of the system will be influenced by overall tension, overall mass and unsupported span. In the system of the present disclosure, mass is highly variable due to changes in the cargo being carried at any one time. Further, there are practical limitations to the extent to which tension may be adjusted. As such, it is envisaged that tuning in order to avoid matching of the frequencies may be achieved by adjusting the unsupported span. The unsupported span in the case of system 1000 is the product of the longitudinal span between neighbouring support beams 700 (i.e. the length of the spacer beams 702), and the lateral span between neighbouring spacer beams 702. It is envisaged that the lateral span may be the most easily adjusted—for example by uneven spacing or increasing the number of spacer beams 702.

Figures 1, 11:
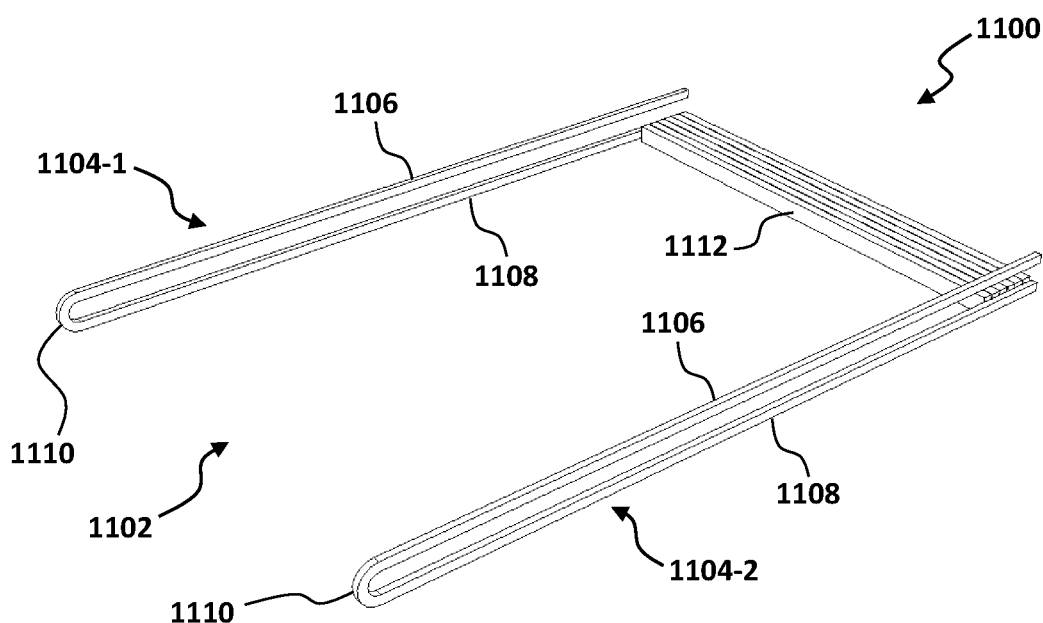
Figures 2, 11:
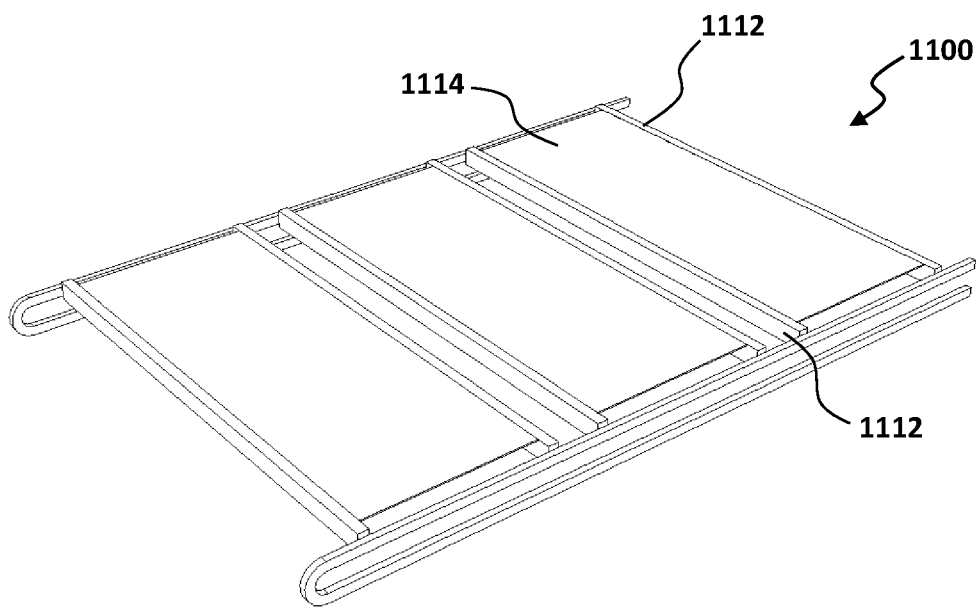
Figures 3, 11:
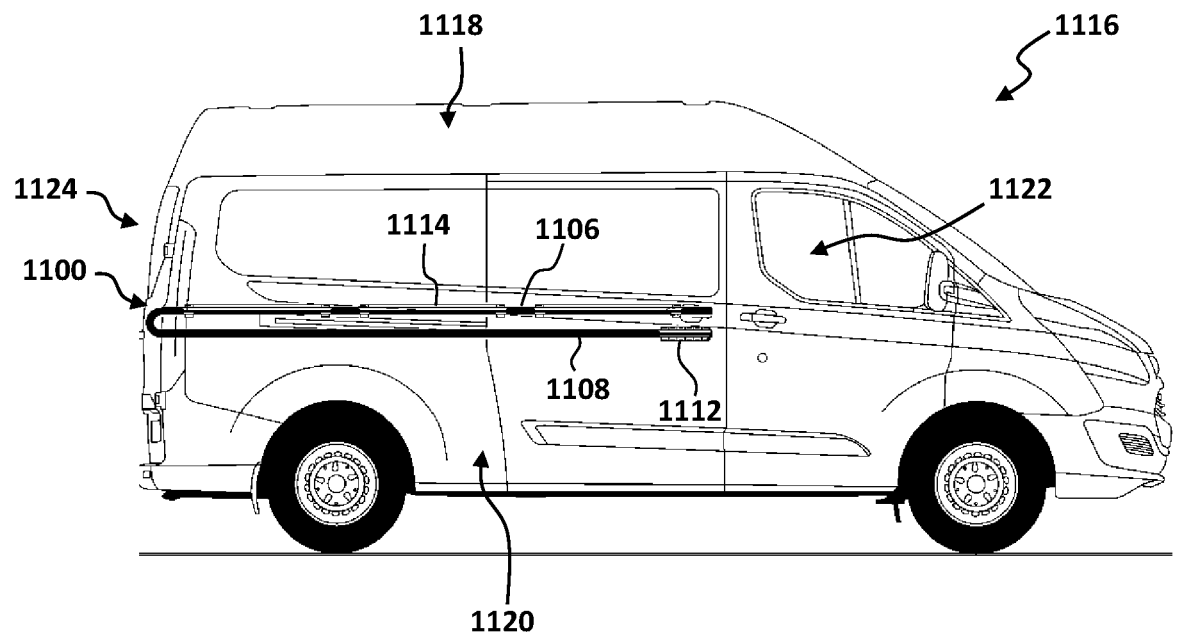

FIGS. 11-1 to 11-3 shows a third exemplary cargo storage system 1100 primarily intended for use with relatively light weight and/or lower capacity vehicles (for example, a van rather than a truck)—although it should be appreciated that wider application is contemplated. The system 1100 comprises a pair 1102 of rail sets 1104-1 and 1104-2. Each rail set 1104 comprises an upper rail 1106, a lower rail 1108 provided below the upper rail 1106, and a transition rail portion 1110 therebetween. In this exemplary embodiment the upper rail 1106 is provided in close proximity to the lower rail 1108, and the transition rail portion 1110 curves in a relatively tight arc between the end of the upper rail 1106 and the end of the lower rail 1108. Support beams 1112 span between the first rail set 1104-1 and the second rail set 1104-2, and may be slid along the rails and locked in place in a fashion similar to that described above. Similarly, spacer beams may be used to join neighboring support beams 1112. Referring to FIG. 11-2, it is envisaged that removeable platforms may be provided between neighboring support beams 1112, for example a retractable sheet 1114 using a similar configuration to that described above with reference to FIG. 10-1 to FIG. 10-3.

Referring to FIG. 11-3, in one embodiment the system 1104 may be installed in a cargo storage space of a cargo vehicle (in this example a van 1116) between the ceiling 1118 and floor 1120 of the storage space. It is envisaged that the support beams 1112 may be stored on the lower rail 1108 towards the driver cab 1122, and pulled towards the rear 1124 when shelving is required. For example, two support beams 1112 may be brought to the rear, assembled to form a trolley, loaded with cargo, and pushed back towards the driver cab 1122 on the upper rail 1106. This allows forklift accessible double stacking across the full depth of the van 1116. It should be appreciated that which FIG. 11-3 is illustrated with the system provided at a mid-point between the ceiling 1118 and floor 1120, is expressly contemplated that the system 1104 may be provided at different heights according to individual needs—for example, proximate the floor 1120 to provide a rolling floor.

It is envisaged that stacking cargo on rolling platforms, such as provided by system 1100, may assist with implementing first-in-last-out (FILO) stacking and/or first-in-first-out (FIFO) stacking for improved logistical efficiencies.

It is envisaged that the upper rail 1106 may be provided in much closer proximity to the lower rail 1108 (for example, in comparison with the configuration of system 200) due to the nature of the cargo typically carried in smaller vehicles. A truck can have very large cargo items in it on a regular basis, with people walking around inside the cargo storage area, making it desirable to move the support beams away from the floor (as may be seen in system 200). A courier van is typically used to transport a large number of smaller cargo items, that can still be packed underneath the support beams 1112 when stored in the position illustrated.

Figures 1, 12:
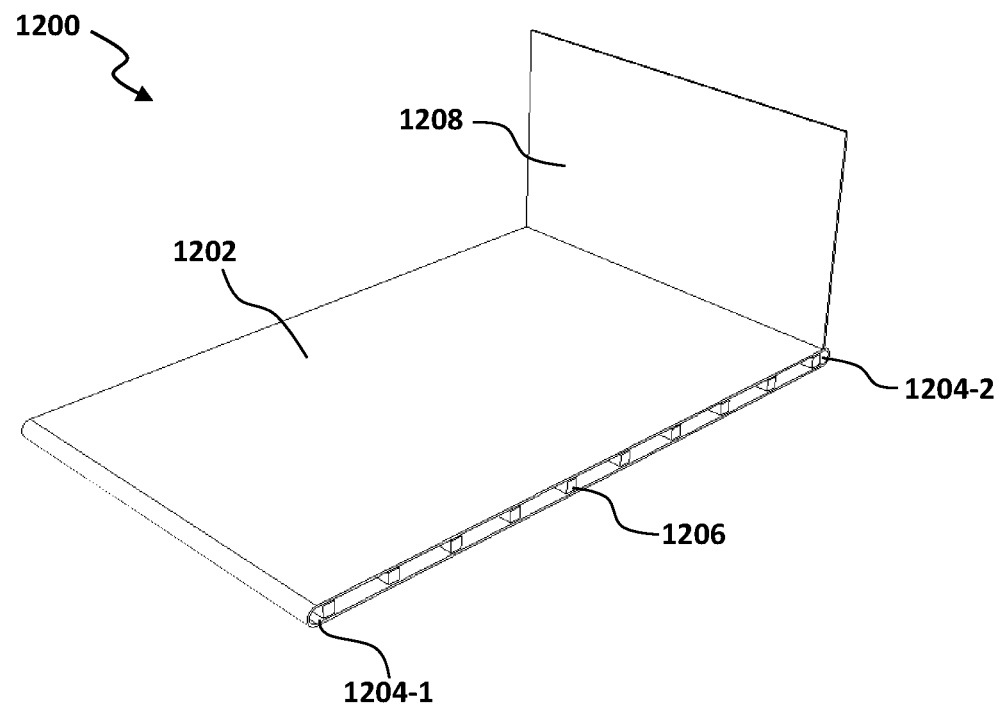
Figures 2, 12:
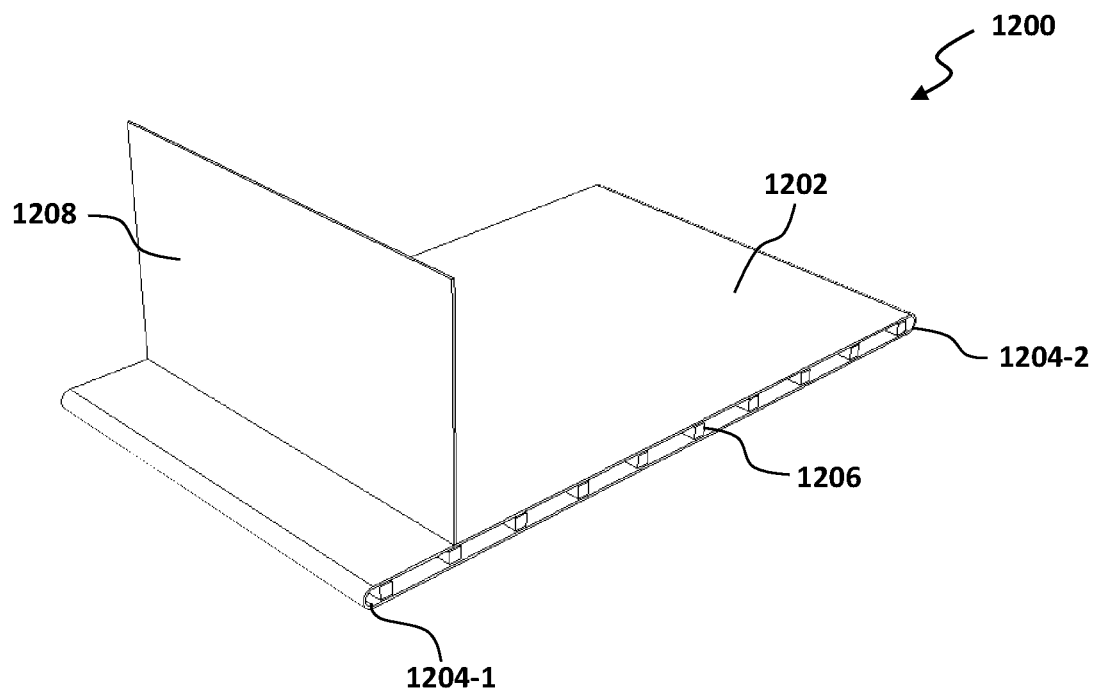
Figures 3, 12:
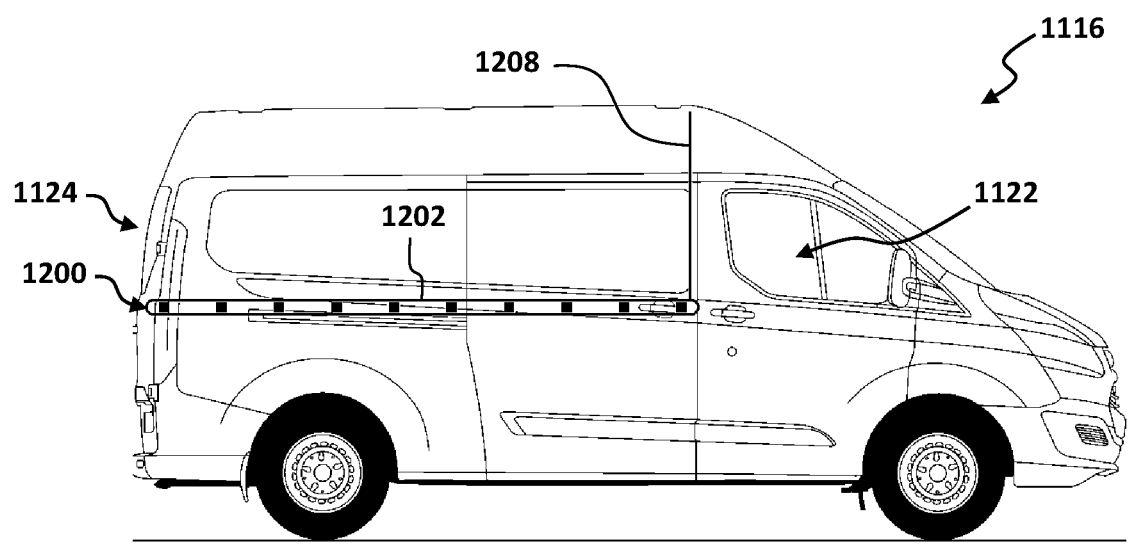

FIG. 12-1 to FIG. 12-3 illustrates an exemplary cargo storage conveyor belt system 1200 comprising a continuous conveyor belt 1202 mounted on rollers (not illustrated) at a first end 1204-1 and second end 1204-2 of the conveyor belt 1202. In the example illustrated internal lateral supports are provided in the form of lateral beams 1206. In an exemplary embodiment the belt of the conveyor belt may be made of a textile, for example an amarid based textile (more particularly a para-amarid fibre textile such as Kevlar™, supplied by DuPont), or a silicone rubber coated glass fabric.

In an exemplary embodiment the conveyor belt 1202 may be driven, for example by an electric motor, although it is also contemplated that the conveyor belt 1202 may be manually moved, for example via a ratchet system, hand wheels, or direct pushing/pulling by a user.

In the exemplary embodiment illustrated the conveyor belt system 1200 comprises a vertical flange 1208 provided to the conveyor belt 1202. In use, it is envisaged that cargo may be stacked against the vertical flange 1208, providing stability to the stack as the conveyor belt 1202 is subsequently moved.

It is envisaged that the conveyor belt system 1200 may be used with relatively light weight and/or lower capacity vehicles (for example, a van rather than a truck). The conveyor belt system 1200 may assist with allow loading/unloading of the cargo in a defined order, for example to allow a courier company to stack packages in the same order as the drop-off route. It is envisaged that this may be in accordance with either first-in-last-out (FILO) or first-in-first-out (FIFO) principles, depending on the configuration of the vehicle and whether it allows for access through the rear door, or rear door and side doors.

Figure 13:
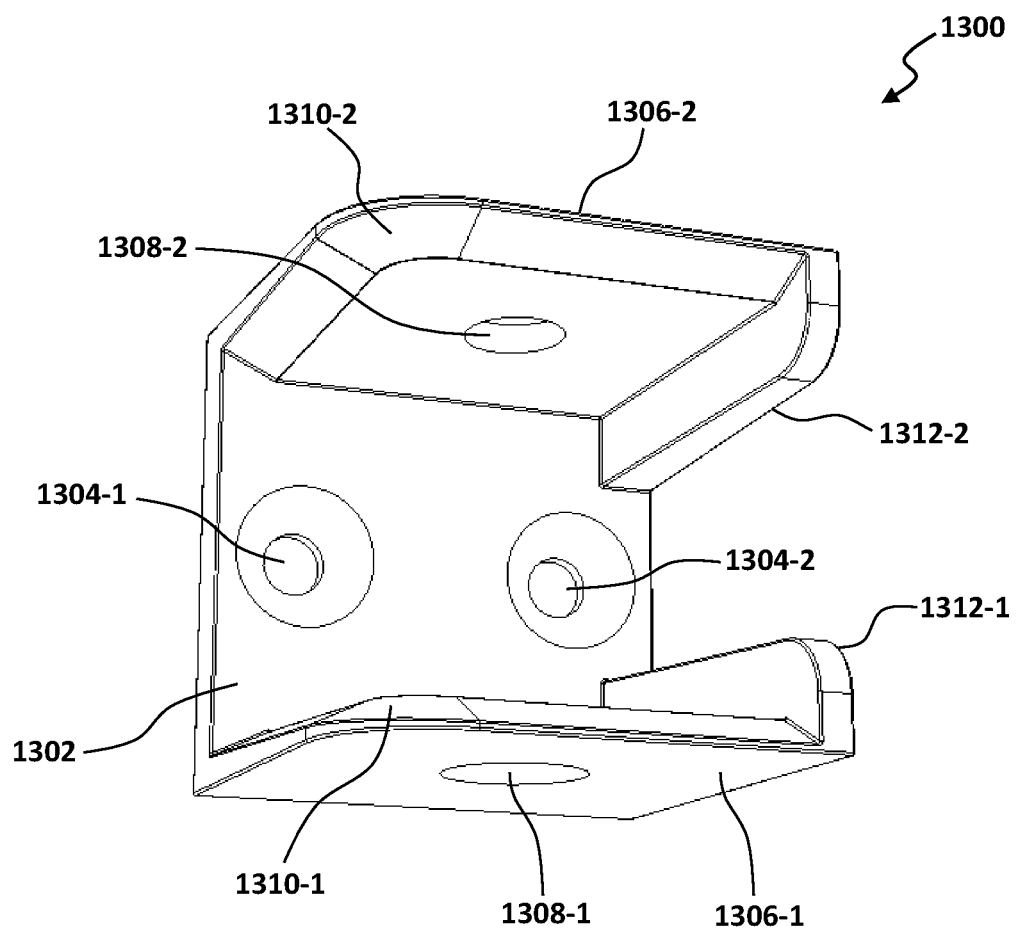
FIG. 13 is a perspective view of an exemplary spacer beam bracket.

FIG. 13 illustrates an exemplary embodiment of a spacer beam bracket 1300 for use in securing spacer beams to support beams in exemplary embodiments of the present disclosure. The bracket 1300 is intended to provide multiple functions: providing a pivotal connection to one end of the spacer beam, releasably connecting to the free end of the spacer beam while it is folded against the support beam in a stored position, and releasably connecting to a spacer beam of a neighboring support beam. The bracket 1300 includes a base 1302, in this embodiment comprising two recessed fastener apertures 1304-1 and 1304-2. A first wall 1306-1 and a second wall 1306-2 extend from the base 1302, each wall 1306 having an associated fastener aperture 1308. Each wall 1306 comprises a chamfered inner edge 1310 extending around a corner of the wall 1306. The bracket 1300 further comprises stops 1312-1 and 1312-2 extending towards each other along one side of the base 1302 from the walls 1306-1 and 1306-2 respectively. In an exemplary embodiment it is envisaged that the bracket 1300 may be manufactured as a monolithic structure, for example a one-piece casting.

In use, the bracket 1300 may provide a pivotal connection to a spacer beam by passing a pin through fastener apertures 1308. The spacer beam may pivot between a first position in which it lies against the base 1302 (i.e. in a stored position), and a second position in which it lies against the stops 1312. The bracket 1300 may provide a releasable connection to the free end of the spacer beam while it is folded against the support beam (i.e. in a stored position) such that the spacer beam lies against the base 1302, by passing a pin though the fastener apertures 1308. The bracket 1300 may provide a releasable connection to the free end of a spacer beam extended from a neighboring support beam and received by the bracket 1300 such that it lies against stops 1312, by passing a pin though the fastener apertures 1308.

The various steps or acts in a method or process described in connection with the present disclosure may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

Reference throughout this specification to "one embodiment" or "an embodiment" (or the like) means that a particular feature, structure, or characteristic described in connection with the embodiment is included in at least one embodiment of the disclosure. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the disclosure will be best understood by reference to the figures. The foregoing description is intended only by way of example and simply illustrates certain selected exemplary embodiments of the disclosure.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

REFERENCE SIGNS LIST

| | |
|---|---|
| 100 | First cargo storage system |
| 102 | Cargo storage area |
| 104 | Side walls |
| 106 | Floor |
| 108 | Ceiling |

| | |
|---|---|
| 110 | Forward end wall |
| 112 | Rearward end |
| 150 | First pair of rails |
| 152-1 | First load rail |
| 152-2 | Second load rail |
| 154 | First end of load rail |
| 156 | Second end of load rail |
| 158 | Drop in beam opening |
| 200 | Second cargo storage system |
| 202 | Second pair of rails |
| 204-1 | First storage rail |
| 204-2 | Second storage rail |
| 206 | First end of storage rail |
| 208 | Second end of storage rail |
| 210 | Third pair of rails |
| 212-1 | First transition rail |
| 212-2 | Second transition rail |
| 214 | Safety station |
| 300 | Track guide assembly |
| 302 | Beam insert portion |
| 304 | Side wall |
| 306 | Upper wall |
| 308 | Lower wall |
| 310 | Central fin |
| 312-1 | First replaceable load plate |
| 312-2 | Second replaceable load plate |
| 314 | Roller mounting portion |
| 316-1 | First load roller |
| 316-2 | Second load roller |
| 318-1 | First side roller |
| 318-2 | Second side roller |
| 320 | Retractable locking pin |
| 400 | Load rail profile |
| 402 | Side section |
| 404 | Wall facing surface |
| 406 | Spacer feature |
| 408 | Track cavity side surface |
| 410 | Upper side recess |
| 412 | Lower side recess |
| 414 | Thicker section of side wall |
| 416 | Lower section |
| 418 | Roller recess |
| 420 | Outer lip |
| 422 | Outer guide surface |
| 424 | Upper section |
| 426 | Side section extension |
| 500 | Storage rail profile |
| 502 | Side section |
| 504 | Wall facing surface |
| 506 | Spacer feature |
| 508 | Track cavity side surface |
| 510 | Upper side recess |
| 512 | Lower side recess |
| 514 | Thicker section of side wall |
| 516 | Lower section |
| 518 | Roller recess |
| 520 | Outer lip |
| 522 | Outer guide surface |
| 524 | Upper section |
| 526 | Side section extension |
| 600 | Support beam extrusion |
| 602 | Upper wall |
| 604 | Lower wall |
| 606-1 | First side wall |
| 606-2 | Second side wall |
| 608 | Internal cavity |
| 610 | Upper internal recess |
| 612 | Lower internal recess |
| 614 | Thicker section of side wall |
| 616 | Castellation |
| 700 | Support beam |
| 702 | Spacer beam |
| 704 | Mounting bracket |
| 706 | Stowing bracket |
| 708 | Receiving bracket |
| 800 | Support platform |
| 900-1 | First panel |
| 900-2 | Second panel |
| 902 | Main body |
| 904 | Panel edge extrusion |
| 906 | Hand hole |
| 908-1 | First locating protrusion |
| 908-2 | Second locating protrusion |
| 910 | Locating flange |
| 1000 | Retractable sheet system |
| 1002 | Retractable sheet extrusion |
| 1004 | Internal cavity |
| 1006 | Winding shaft |
| 1008 | Flexible sheet |
| 1010 | Bead |
| 1012 | Hand hole |
| 1014 | Hook |
| 1016 | Inner rim |
| 1018 | Seat recess |
| 1100 | Third cargo storage system |
| 1102 | Pair of rail sets |
| 1104-1 | First rail set |
| 1104-2 | Second rail set |
| 1106 | Upper rail |
| 1108 | Lower rail |
| 1110 | Transition rail portion |
| 1112 | Support beam |
| 1114 | Retractable sheet |
| 1116 | Cargo van |
| 1118 | Ceiling |
| 1120 | Floor |
| 1122 | Driver cab |
| 1124 | Rear of cargo space |
| 1200 | Conveyor belt system |
| 1202 | Conveyor belt |
| 1204-1 | First end of conveyor belt |
| 1204-2 | Second end of conveyor belt |
| 1206 | Lateral beam |
| 1208 | Vertical flange |
| 1300 | Spacer beam bracket |
| 1302 | Base |
| 1304-1 | First recessed fastener aperture |
| 1304-2 | Second recessed fastener aperture |
| 1306-1 | First wall |
| 1306-2 | Second wall |
| 1308 | Fastener aperture |
| 1310 | Chamfered inner edge |
| 1312-1 | First stop |
| 1312-2 | Second stop |

The invention claimed is:

1. A cargo storage system comprising:
at least one pair of rails configured to extend along a length of the cargo storage area in a horizontal direction, the pair of rails comprising a first rail configured to extend along a first side of the cargo storage area, and a second rail configured to extend along a second side of the cargo storage area opposing the first rail,
wherein each rail has a rail profile comprising a side section, an upper section extending from the side section, and a lower section extending from the side section and opposing the upper section, wherein the side section, the upper section, and the lower section define an enclosed track cavity and an internal surface of the side section forming part of the enclosed track cavity comprises at least one recess extending along the length of the rail; and
a plurality of support beams, each support beam configured to extend between, and be supported by, the first rail and the second rail,
wherein each of the plurality of support beams comprises a support surface configured to face upwardly in use to support a load placed on the support beam, a first track guide at a first end and a second track guide at a second end, wherein the first track guide is configured to be received by the enclosed track cavity of the first rail and the second track guide is configured to be received by the enclosed track cavity of the second rail.

2. The cargo storage system of claim 1, wherein the side section extends beyond the upper section and the lower section.

3. The cargo storage system of claim 1, wherein the rail profile comprises a plurality of locking pin locating features in the side section at a location where the thickness of the side section is greater than at the at least one recess.

4. The cargo storage system of claim 1, wherein:
the at least one pair of rails comprises a first pair of rails and a second pair of rails, wherein the first pair of rails is provided above the second pair of rails within the cargo storage area;
the cargo storage system further comprises a pair of transition rails between the first pair of rails and the second pair of rails, wherein the transition rails follow a nonvertical path between the first pair of rails and the second pair of rails, and each transition rail forms a junction with an associated horizontal rail of the second pair of rails, wherein the horizontal rail extends in both directions from the junction; and
each transition rail comprises a safety station configured to present a tortuous section to a support beam passing along the transition rails.

5. The cargo storage system of claim 4, wherein the first pair of rails comprise a first rail profile, and the second pair of rails comprise a second rail profile.

6. The cargo storage system of claim 5, wherein the first rail profile is lighter than the second rail profile.

7. The cargo storage system of claim 5, wherein the side section of the second rail profile extends further below the lower section than in the first rail profile.

8. The cargo storage system of claim 1, wherein each rail of one pair of rails of the at least one pair of rails comprises a drop in beam opening on an upper side of the rail leading into the enclosed track cavity.

9. The cargo storage system of claim 1, wherein each of the plurality of support beams comprises at least one spacer beam pivotally attached thereto, configured to pivot from a stored position against the support beam and an in-use position extending from the support beam, wherein each of the plurality of support beams comprises a spacer beam bracket to which the spacer beam extending from a neighboring one of the each of the plurality of support beams is releasably secured, wherein the spacer beam bracket has a monolithic structure comprising a base, a first wall and a second wall extending from the base and having a space therebetween, each of the first wall and the second wall comprising a chamfered inner edge extending around a corner of the wall, and a first stop and a second stop extending towards each other along one side edge of the base from the first wall and the second wall respectively.

10. The cargo storage system of claim 1, wherein the support surface of each of the plurality of support beams comprises a plurality of ridges, wherein the width of each of the ridges is greater than the height of the ridge.

11. The cargo storage system of claim 1, wherein each of the plurality of support beams has a hollow structural section comprising an upper wall, a lower wall, a first side wall, and a second side wall defining an internal cavity, wherein each side wall comprises one or more internal recesses extending along the length of the internal cavity.

12. The cargo storage system of claim 11, wherein each of the first side wall and the second side wall comprises two internal recesses, the two internal recesses spaced apart to retain a thicker section therebetween.

13. The cargo storage system of claim 1, further comprising at least one platform member configured to extend between a first support beam and a second support beam of the plurality of support beams.

14. The cargo storage system of claim 13, wherein the platform member comprises a flexible sheet material.

15. The cargo storage system of claim 14, wherein the flexible sheet material is an amarid based textile.

16. The cargo storage system of claim 14, wherein the flexible sheet is retractable into the support beam.

17. The cargo storage of claim 16, wherein each of the plurality of support beams comprises a winding shaft about which the flexible sheet is wound in a retracted condition.

18. The cargo storage of claim 17, wherein each of the plurality of support beams comprises a storage cavity in which the winding shaft is provided.

19. The cargo storage of claim 17, wherein each of the plurality of support beams comprises a retraction mechanism configured to bias rotation of the winding shaft in a direction so as to retract the flexible sheet.

20. The cargo storage of claim 13, wherein the natural frequency of the system is tuned by adjusting the unsupported span of the platform member.

* * * * *